United States Patent
Kurata et al.

(10) Patent No.: US 10,380,773 B2
(45) Date of Patent: Aug. 13, 2019

(54) INFORMATION PROCESSING APPARATUS, INFORMATION PROCESSING METHOD, AND COMPUTER READABLE MEDIUM

(75) Inventors: Masatomo Kurata, Tokyo (JP); Koji Sato, Tokyo (JP); Yusuke Sakai, Kanagawa (JP); Tomohiro Ishii, Tokyo (JP); Makoto Murata, Tokyo (JP); Naoki Shibuya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1590 days.

(21) Appl. No.: 13/589,440

(22) Filed: Aug. 20, 2012

(65) Prior Publication Data
US 2013/0086458 A1  Apr. 4, 2013

(30) Foreign Application Priority Data
Sep. 30, 2011 (JP) ................................ 2011-216582

(51) Int. Cl.
*G06F 17/00* (2019.01)
*G06T 11/60* (2006.01)

(52) U.S. Cl.
CPC .................................... *G06T 11/60* (2013.01)

(58) Field of Classification Search
CPC ....... G06F 17/212; G06F 17/24; G06F 17/211
USPC ................ 715/243, 246, 255, 202, 204, 763
See application file for complete search history.

(56) References Cited

U.S. PATENT DOCUMENTS

| | | | | |
|---|---|---|---|---|
| 8,301,999 B2* | 10/2012 | Olson | ........................... | 715/246 |
| 9,083,933 B2* | 7/2015 | Sato | ..................... | G11B 27/105 |
| 9,286,668 B1* | 3/2016 | Angilivelil | ................ | G06T 7/00 |
| 2004/0125150 A1* | 7/2004 | Adcock | .................. | G06F 16/54 |
| | | | | 715/810 |
| 2008/0077569 A1* | 3/2008 | Lee | ........................ | G06F 16/358 |
| 2010/0182501 A1* | 7/2010 | Sato | ........................ | G06T 11/60 |
| | | | | 348/441 |
| 2010/0228526 A1* | 9/2010 | Moore, III | ............. | G06Q 30/02 |
| | | | | 703/1 |
| 2010/0315315 A1* | 12/2010 | Osborne | .................. | G09G 3/20 |
| | | | | 345/1.3 |
| 2012/0013640 A1* | 1/2012 | Chen | ............................ | 345/619 |
| 2012/0251001 A1* | 10/2012 | Hsu | ........................ | G06F 17/212 |
| | | | | 382/173 |
| 2013/0318424 A1* | 11/2013 | Boyd | ................... | G11B 27/031 |
| | | | | 715/202 |

FOREIGN PATENT DOCUMENTS

| | | |
|---|---|---|
| JP | HEI 09-265547 | 10/1997 |
| JP | 2009-065462 | 3/2009 |
| JP | 2010-191934 | 9/2010 |

* cited by examiner

Primary Examiner — Stephen S Hong
Assistant Examiner — Matthew J Ludwig
(74) Attorney, Agent, or Firm — Xsensus, LLP

(57) ABSTRACT

An apparatus includes an edit command receiving unit and an editing unit. The edit command receiving unit is configured to receive a command with respect to a first image to edit a comic style page layout including a plurality of images. The editing unit is configured to edit the comic style page layout in accordance with the command and with respect to at least one of the plurality of images.

18 Claims, 33 Drawing Sheets

FIG. 13C
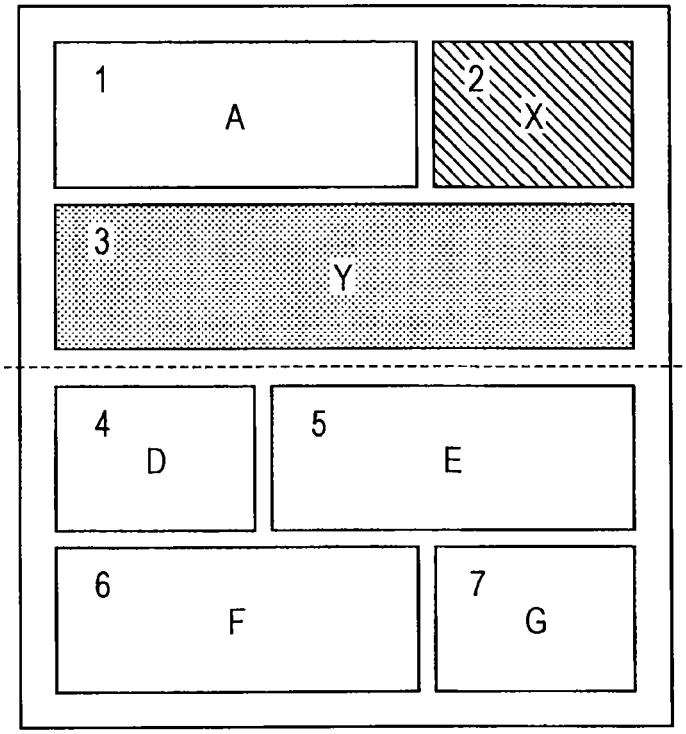
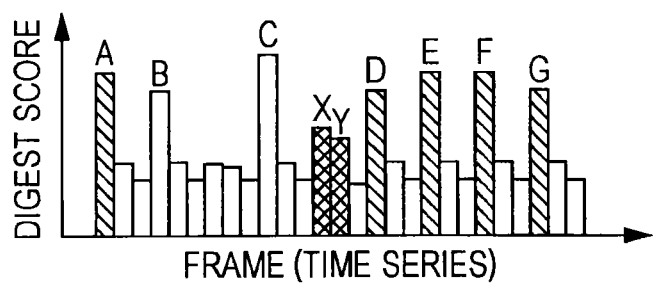

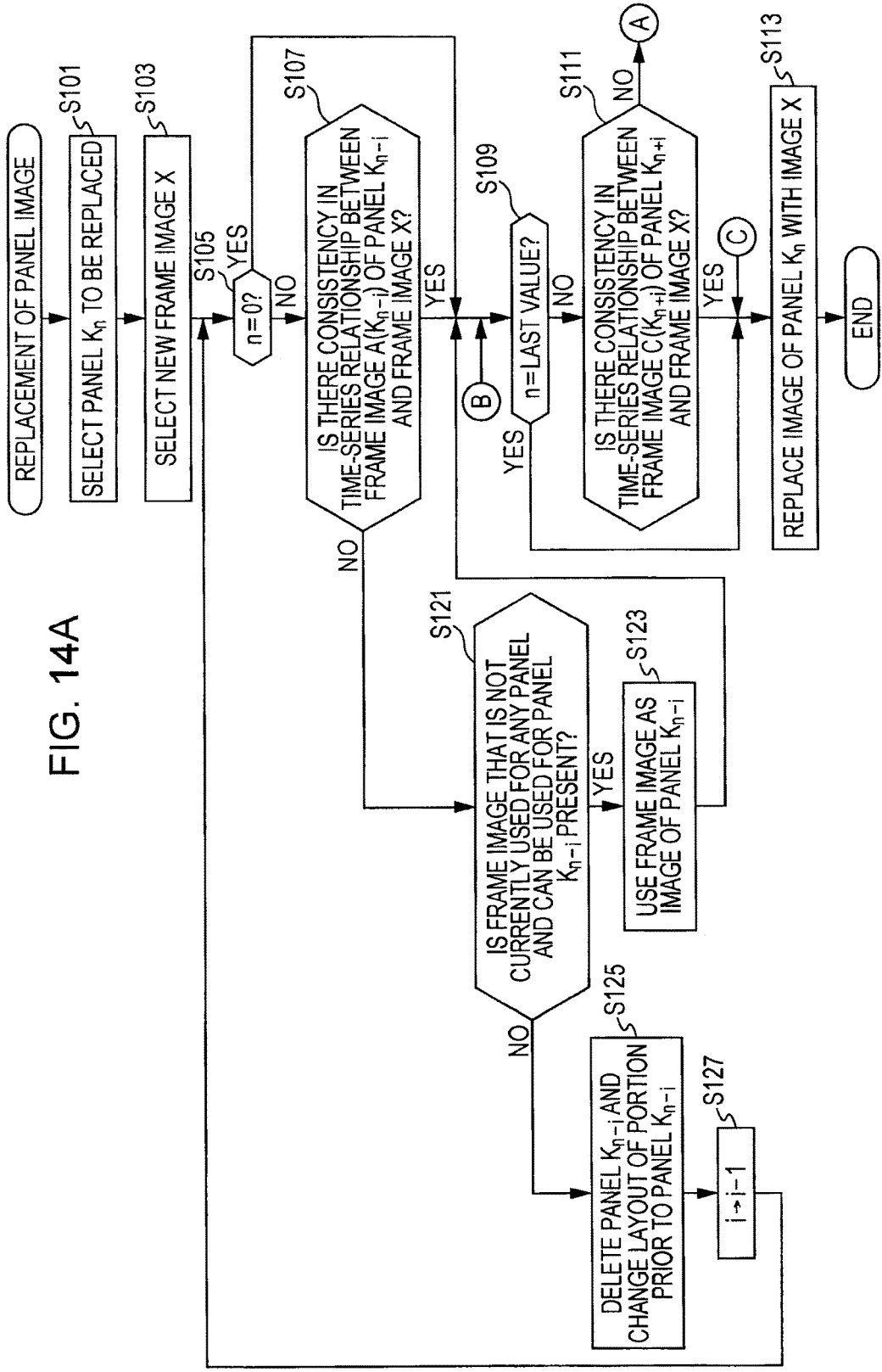

FIG. 15B
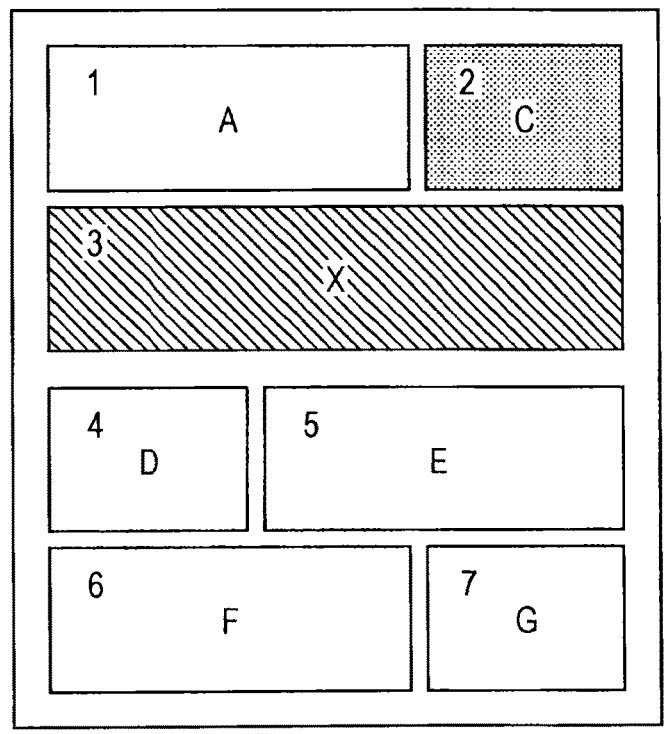
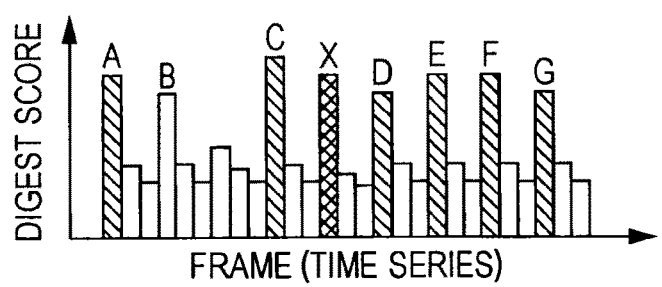
INCREASE DIGEST SCORE OF FRAME IMAGE X AND RE-SET ASSIGNMENT FIG. 15C
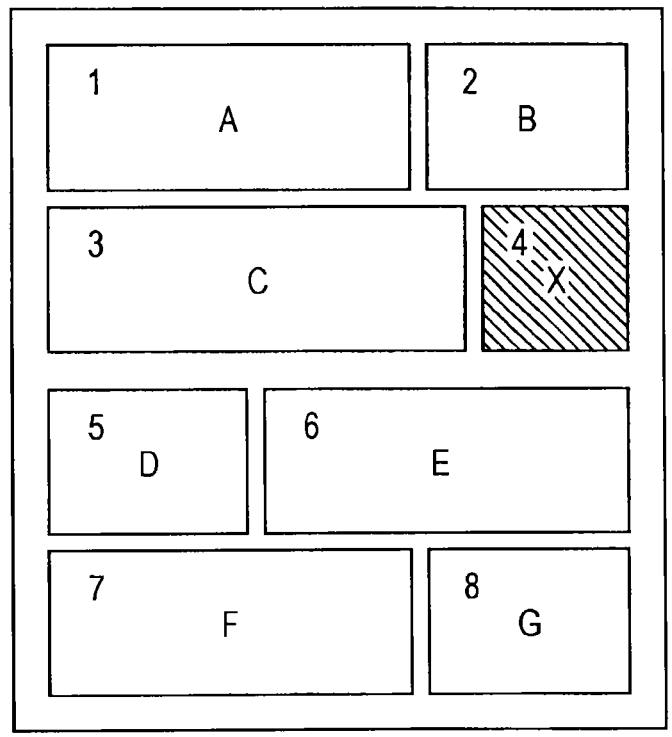
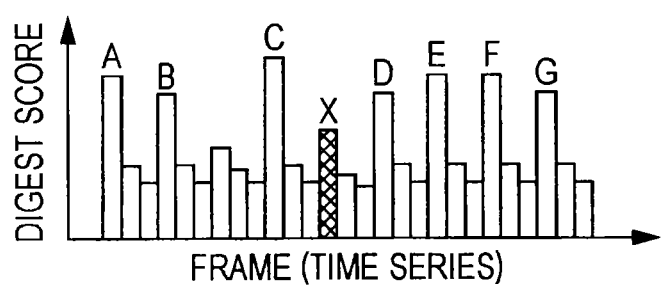
DIVIDE DISPLAY REGION INTO EDIT-UNIT TIERS BEFORE AND AFTER FRAME IMAGE X AND RE-SET ASSIGNMENT IN EACH TIER FIG. 17A
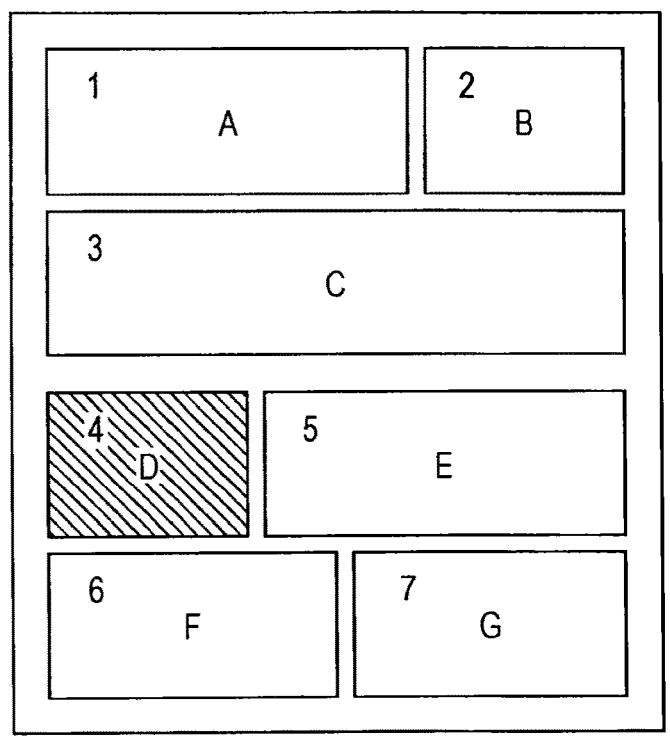
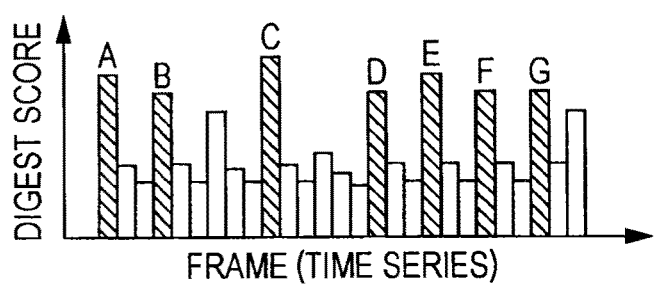

FIG. 17B
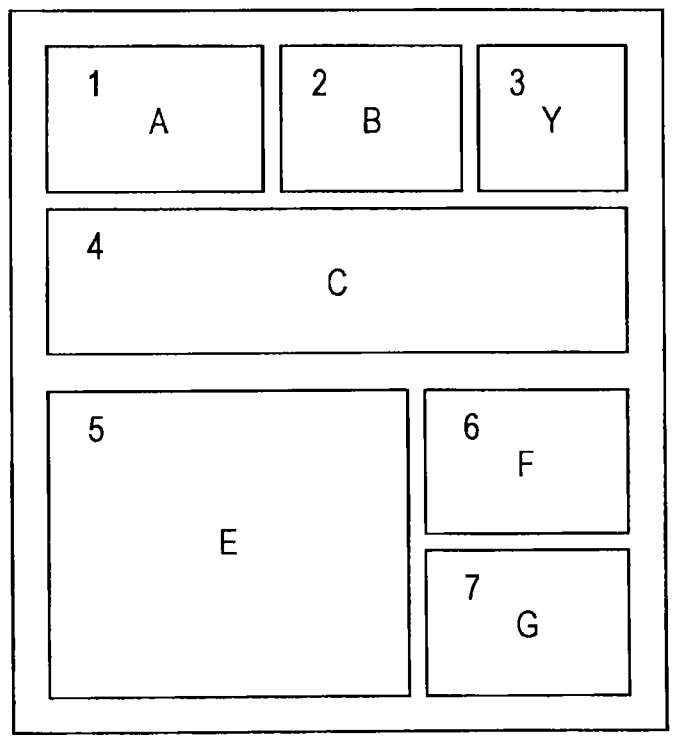
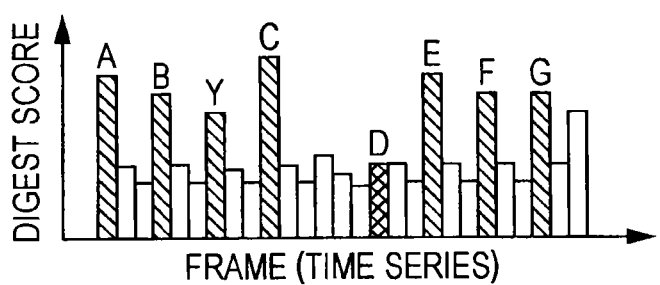
REDUCE DIGEST SCORE OF IMAGE ARRANGED ON PANEL D AND RE-ARRANGE LAYOUT FIG. 17C
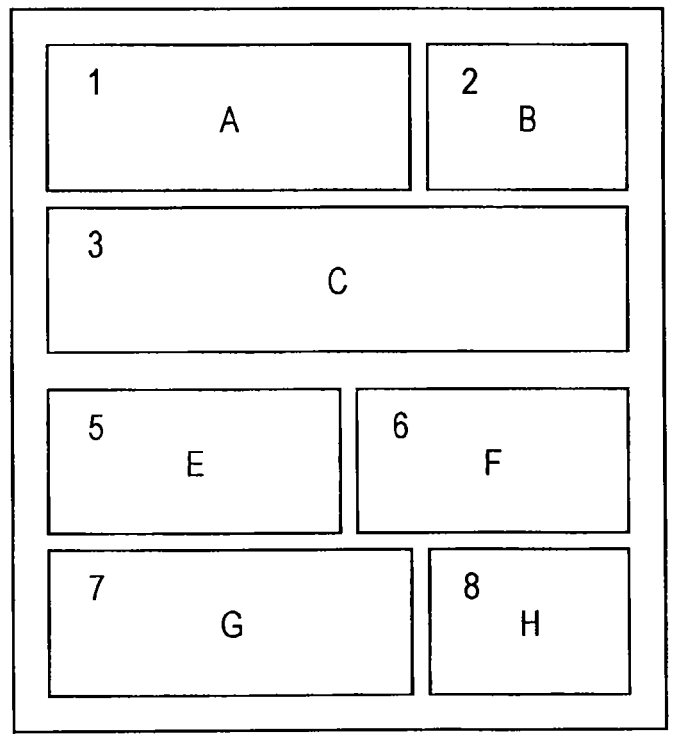
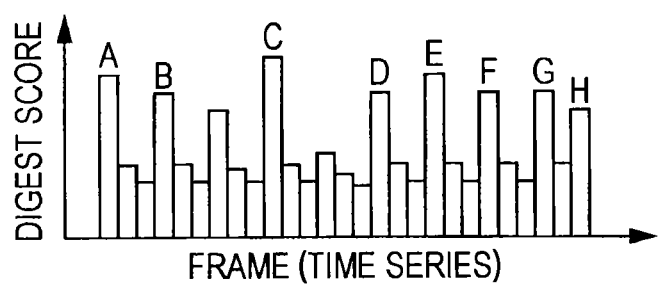
DIVIDE DISPLAY REGION INTO EDIT-UNIT TIERS BEFORE AND AFTER PANEL D AND RE-SET ASSIGNMENT IN ONE OF TIERS

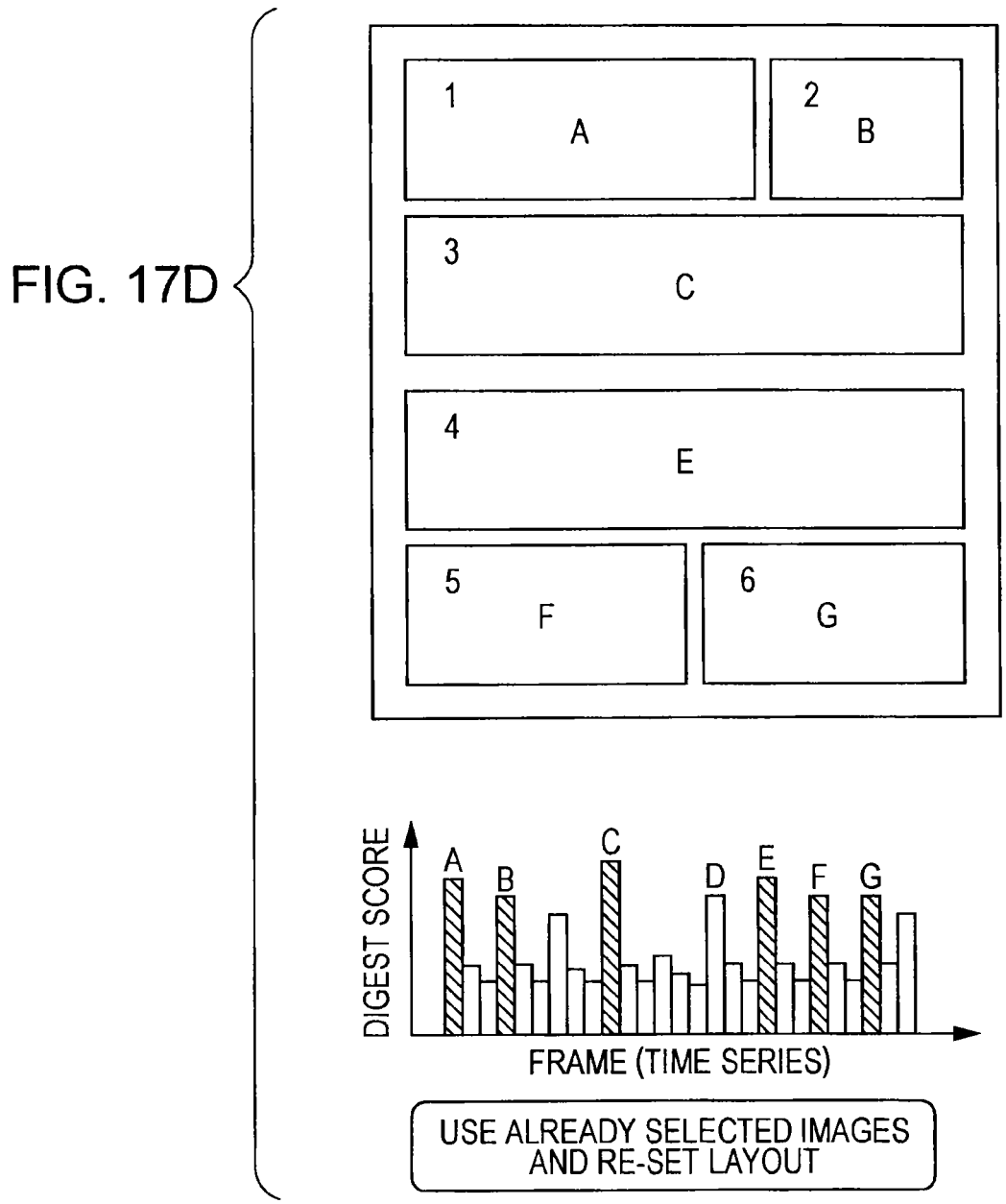

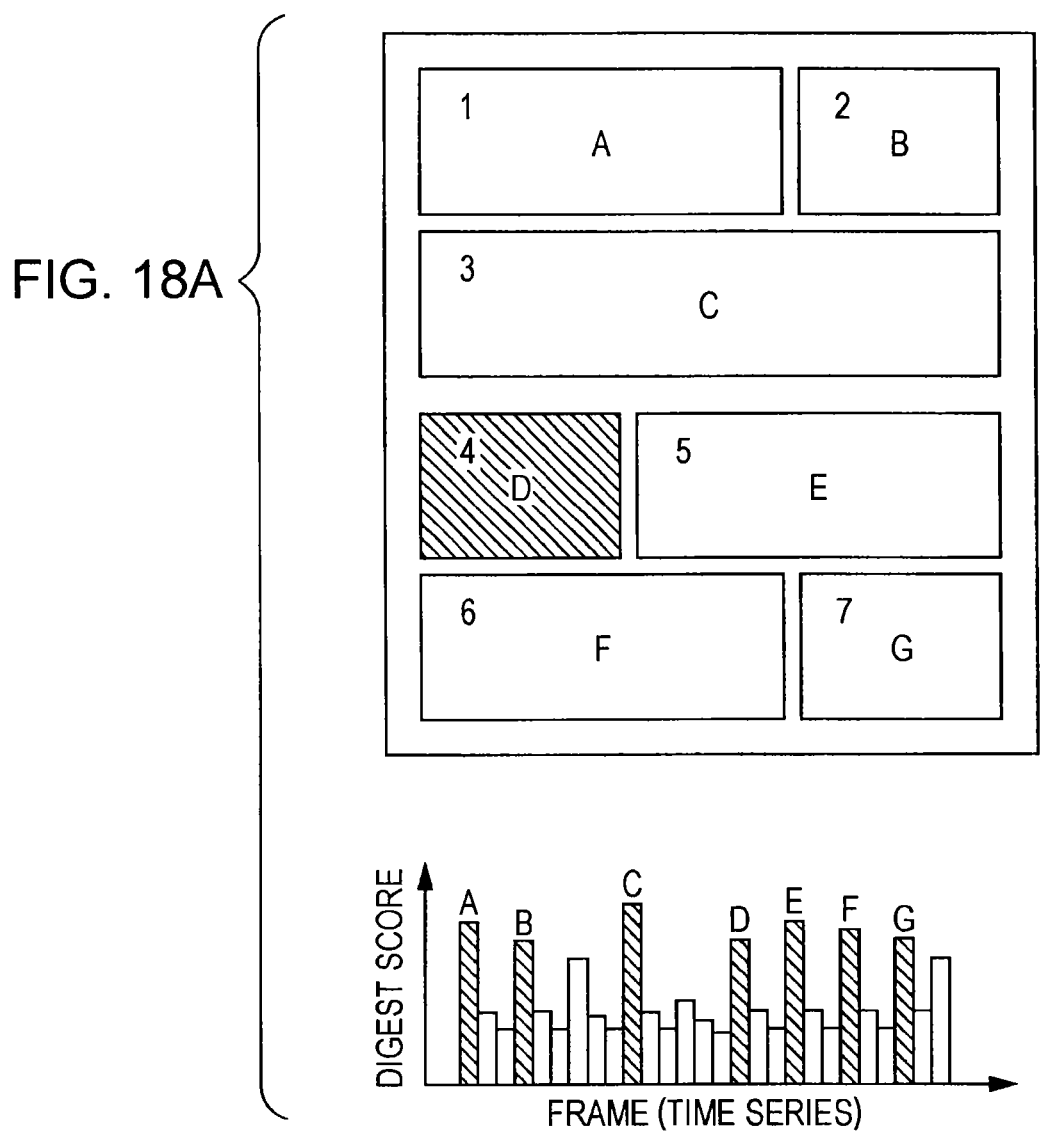

FIG. 18B
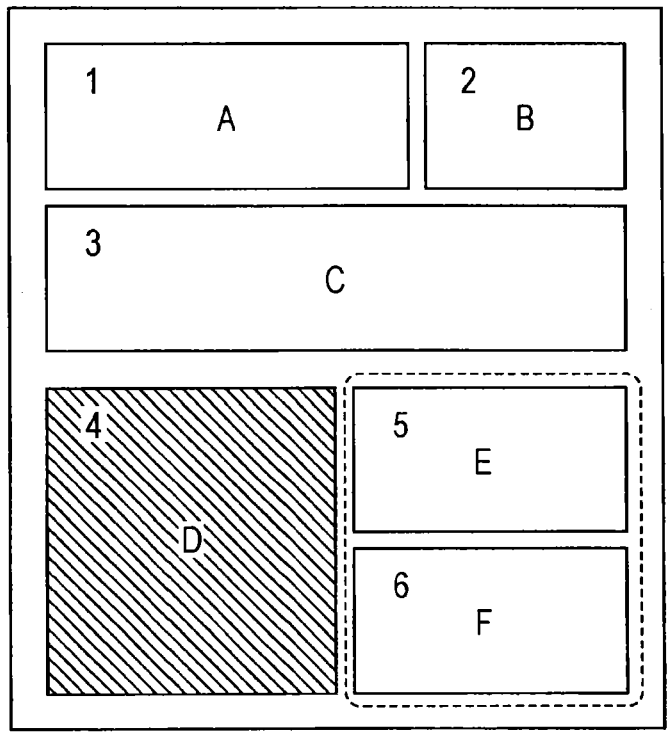
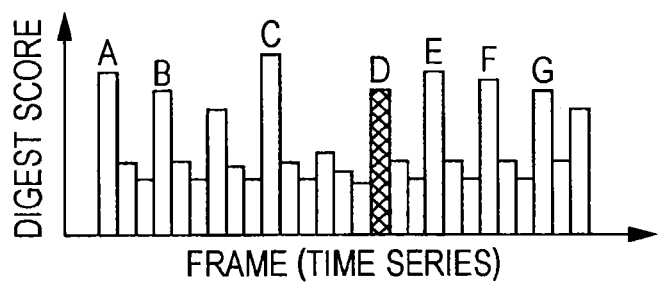
DIVIDE DISPLAY REGION INTO EDIT-UNIT TIERS BEFORE AND AFTER PANEL D AND RE-SET ASSIGNMENT IN ONE OF TIERS

INFORMATION PROCESSING APPARATUS, INFORMATION PROCESSING METHOD, AND COMPUTER READABLE MEDIUM

CROSS-REFERENCE TO RELATED APPLICATIONS

The present application is based upon and claims the benefit of priority under 35 U.S.C. § 119 of Japanese Priority Patent Application JP 2011-216582 filed in the Japanese Patent Office on Sep. 30, 2011, the entire contents of which are hereby incorporated by reference.

BACKGROUND

The present disclosure relates to an information processing apparatus, an information processing method, and a program encoded on a non-transitory computer readable medium.

In recent years, with widespread use of image-capture apparatuses that are capable of capturing still pictures and/or moving pictures, the amounts of still-picture content and/or moving-picture content collected by individual users are on the rise. Thus, there are increasing demands for a summary viewing technology, i.e., a new method of searching for and viewing still-picture archives and/or moving-picture archives.

With advancement of information processing technology, electronic books, electronic comics, and so on are becoming common and there are also increasing demands for easy generation of such electronic comics from still pictures and/or moving pictures photographed by the individual users.

In view of such demands, as the method of viewing a summary of content including a still picture and/or a moving picture, Japanese Unexamined Patent Application Publication No. 2010-191934 discloses a technology in which images are automatically extracted from content including a still picture and/or a moving picture and the extracted images are arranged in a comic style to provide a user with a content summary (digest).

SUMMARY

Although a content summary can be automatically generated in the technology disclosed in Japanese Unexamined Patent Application Publication No. 2010-191934, the content summary may be different from what the user intends, since it is automatically generated based on the amounts of features that represent the content.

Thus, there have been demands for a technology that allows a user to easily perform layout-edit tasks, such as panel addition, deletion, and modification, on a comic-style content summary generated from content including a still picture and/or a moving picture.

Accordingly, in view of the foregoing situation, the present disclosure provides an information processing apparatus, an information processing method, and a program encoded on a non-transitory computer readable medium which allow layout-edit processing to be easily performed on comic-style digest content generated from content including a still picture and/or a moving picture.

In one embodiment, the present invention includes an apparatus that includes an edit command receiving unit and an editing unit. The edit command receiving unit is configured to receive a command with respect to a first image to edit a comic style page layout including a plurality of images. The editing unit is configured to edit the comic style page layout in accordance with the command and with respect to at least one of the plurality of images.

According to another ewe embodiment of the present disclosure, there is provided an information processing apparatus including an edit processing section that edits, with respect to digest content generated based on content including at least one of a still picture and a moving picture and obtained by arranging images extracted from the content in a comic style in a display region in which panels are laid out, at least one of the layout of the panels and the arrangement of the images on the panels in accordance with a user operation.

According to another embodiment of the present disclosure, there is provided an information processing method including editing, with respect to digest content generated based on content including at least one of a still picture and a moving picture and obtained by arranging images extracted from the content in a comic style in a display region in which panels are laid out, at least one of the layout of the panels and the arrangement of the images on the panels in accordance with a user operation.

According to still another embodiment of the present disclosure, there is provided a program encoded on a non-transitory computer readable medium for causing a computer to realize an edit processing function for editing, with respect to digest content generated based on content including at least one of a still picture and a moving picture and obtained by arranging images extracted from the content in a comic style in a display region in which panels are laid out, at least one of the layout of the panels and the arrangement of the images on the panels in accordance with a user operation.

According to the present disclosure, at least one of the layout of the panels in the digest content and the arrangement of the images on the panels is edited in accordance with the user operation.

As described above, according to the present disclosure, layout-edit processing can be easily performed on comic-style digest content generated from a still picture and/or a moving picture.

BRIEF DESCRIPTION OF THE DRAWINGS

FIG. 13C illustrates layout-edit processing for the comic representation data in the embodiment;

FIG. 14A is a flowchart illustrating one example of a flow of replacement processing for a panel image in the embodiment;

FIG. 15B illustrates layout-edit processing for the comic representation data in the embodiment;

FIG. 15C illustrates layout-edit processing for the comic representation data in the embodiment;

FIG. 17A illustrates layout-edit processing for the comic representation data in the embodiment;

FIG. 17B illustrates layout-edit processing for the comic representation data in the embodiment;

FIG. 17C illustrates layout-edit processing for the comic representation data in the embodiment;

FIG. 17D illustrates layout-edit processing for the comic representation data in the embodiment;

FIG. 18A illustrates layout-edit processing for the comic representation data in the embodiment;

FIG. 18B illustrates layout-edit processing for the comic representation data in the embodiment;

DETAILED DESCRIPTION OF EMBODIMENTS

Figure 1:
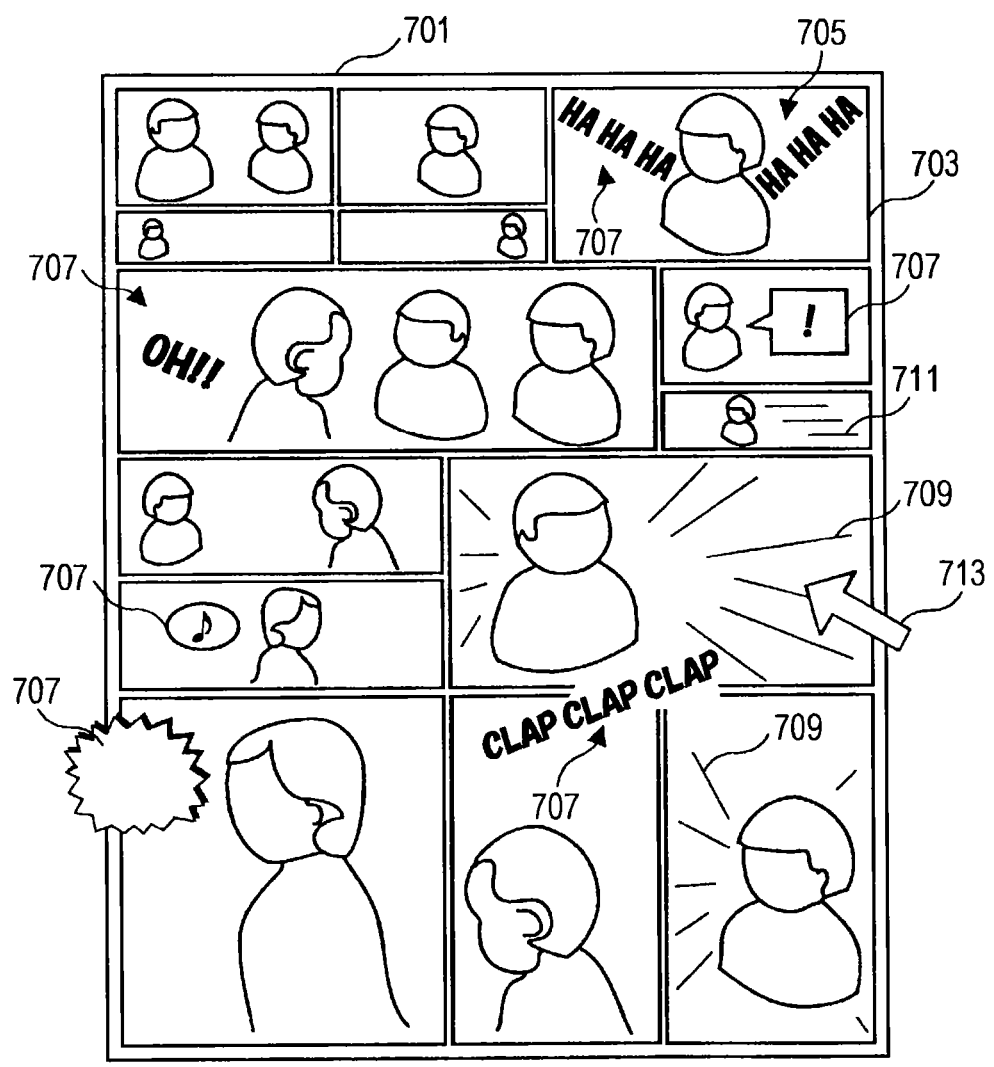
FIG. 1 is a schematic view illustrating digest content, which is obtained by representing a summary of content in a comic style.

Preferred embodiments of the present disclosure will be described below in detail with reference to the accompanying drawings. In this specification and the accompanying drawings, elements having substantially the same functional configurations are denoted by the same reference numerals and redundant descriptions thereof are omitted.

A description below is given in the following order:
(1) Digest Content Having Comic-Style Layout
(2) First Embodiment
    (2-1) One Example of User Interface
    (2-2) Configuration of Information Processing Apparatus
    (2-3) First Modification
(3) Hardware Configuration of Information Processing Apparatus According to Embodiment of Present Disclosure
(4) Summary (Digest Content Having Comic-Style Layout)

Before a description is given of an information processing apparatus and an information processing method according to an embodiment of the present disclosure, digest content having a comic-style layout in the embodiment of the present disclosure will be described with reference to FIG. 1. FIG. 1 is a schematic view illustrating digest content, which is obtained by representing a summary of content in a comic style.

The digest content in the embodiment of the present disclosure is created based on one or multiple pieces of still-picture content and/or moving-picture content. The digest content is content obtained by extracting images of important scenes and/or characteristic scenes from multiple images contained in still-picture content and/or moving-picture content and arranging the extracted images in a comic style, as illustrated in FIG. 1.

A display region 701 as illustrated in FIG. 1 will now be discussed. The display region 701 corresponds to a page in a typical comic. In the display region 701, multiple panels 703 are laid out. Images (e.g., thumbnail images) 705 contained in moving-picture data and/or still-picture data are arranged on the panels 703.

For example, screen effects, such as various speech balloons and bubbles 707, converging lines 709, and effect lines 711, are automatically are arranged on the thumbnail images 705, on the basis of metadata associated with the moving-picture data and/or still-picture data. The speech balloons and bubbles 707, the converging lines 709, the effect lines 711, and so on may be freely arranged inside and outside the panels 703 in the same manner as those in typical paper comics.

In some cases, a viewer/listener of such digest content may wish to recognize what kind of scene is represented by a certain thumbnail image 705. In this case, the user operates an input device, including, for example, a mouse, a keyboard, and a touch panel, to move a position-selecting object 713, such as a mouse pointer, to the desired thumbnail image 705, thereby entering the so-called "mouseover" state. In response, in the digest content, animation or voice playback starting at the thumbnail 705 in the panel is executed with respect to the thumbnail image 705 over which the position-selecting object 713 is placed.

Although only one display region 701 is depicted in FIG. 1, the size of the display region 701 may be changed depending on the size of the display screen or the like and multiple display regions 701 may also be arranged within a single display screen.

In the digest content, images for the moving picture and/or still picture are basically arranged in order of time information associated with the images. Thus, the user can easily recognize the contents of the moving-picture data, still-picture data, or the like in the same manner as in the case of reading typical comics. In addition, since the screen effects, such as a speech balloon and a speech bubble, are automatically arranged according to the metadata associated with the thumbnail images, the viewer/listener can check the contents of the content, such as the moving-picture data and/or still-picture data, while enjoying it.

Digest content as described above is a summary of content automatically created based on content, such as still-picture content and/or moving-picture content. However, references used for the automatic creation of the digest content are expressed by scores representing the amounts of features that represent the original content (the scores correspond to the "digest scores" in Japanese Unexamined Patent Application Publication No. 2010-191934). Therefore, since the digest content as it is automatically created is content automatically created based on only the amounts of features, there is the possibility that the content is not what the user intends.

Thus, there has been a demand for technology that enables a user to easily perform layout-edit tasks, such as panel addition, deletion, and modification, on a comic-style content summary created from content including a still picture and/or a moving picture.

Accordingly, the present inventors made extensive and intensive studies in order to overcome the above-described points and conceived an information processing apparatus and an information processing method according to the embodiment of the present disclosure, as described below. Technical ideas in the present disclosure will be described below in detail with reference to FIGS. 2 to 23.

(First Embodiment)
<One Example of User Interface>

First, one example of a user interface provided by an information processing apparatus according to a first embodiment of the present disclosure will be briefly described with reference to FIGS. 2 to 10. FIGS. 2 to 10 are schematic views illustrating one example of a user interface of the information processing apparatus according to the present embodiment.

The information processing apparatus according to the present embodiment has, at least, a function for storing and managing created digest content, a function for playing back (executing) the digest content, and a function for editing the created digest content. The information processing apparatus according to the present embodiment may further have a function for creating digest content on the basis of various types of content including moving-picture content and/or still-picture content.

Figure 2:
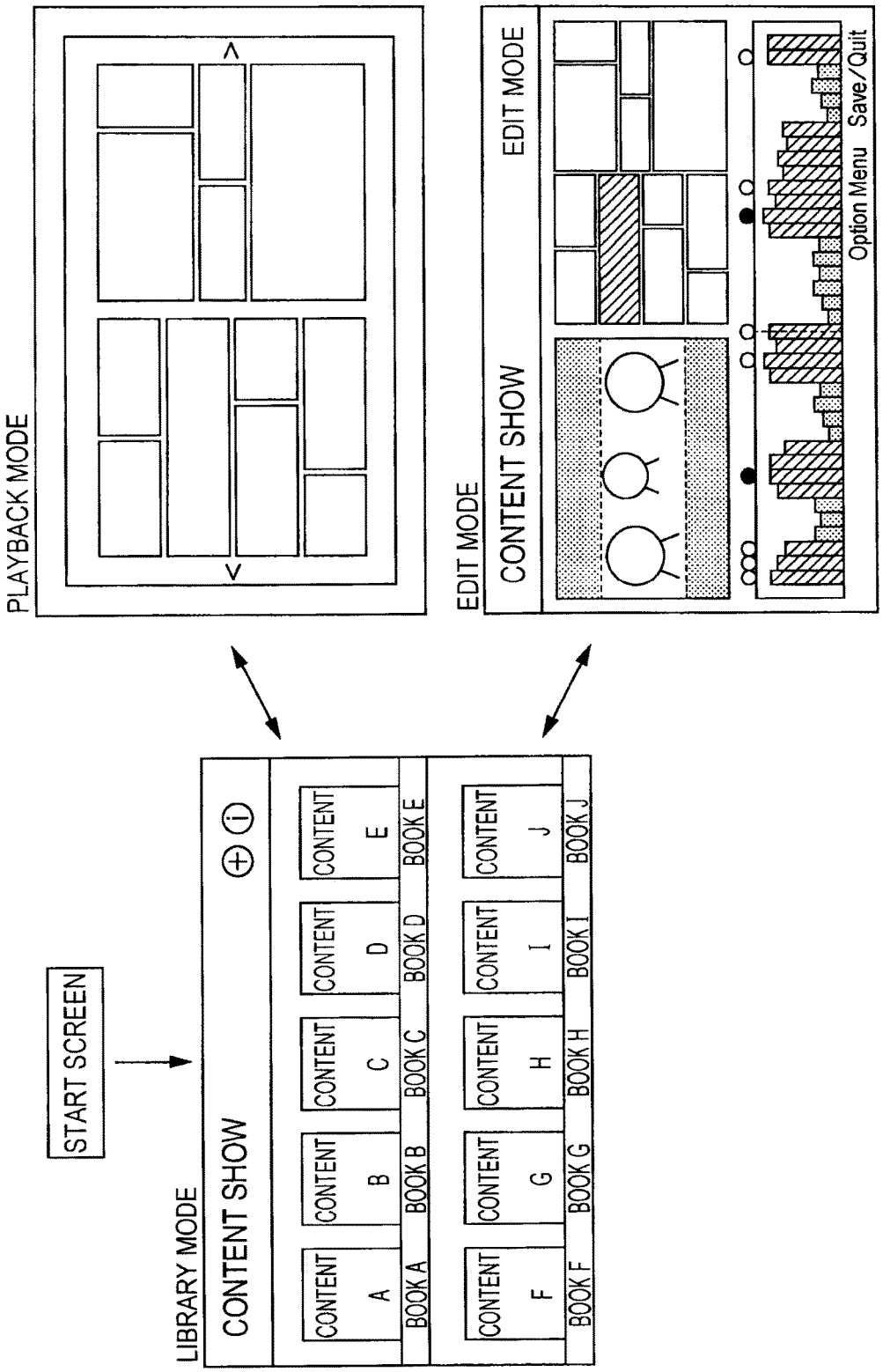
FIG. 2 illustrates a user interface of an information processing apparatus according to an embodiment of the present disclosure.

Upon execution of an application for providing the user with the above-described functions for the digest content, the information processing apparatus according to the present embodiment presents the user with an arbitrary start screen and then a display window for a "library mode" as illustrated in FIG. 2. The "library mode" illustrated in FIG. 2 is a mode in which the information processing apparatus provides the user with a list of digest content managed by the information processing apparatus.

When the user selects an object, such as an icon, displayed on the display window in the library mode and associated with the managed digest content, the display window changes to a window for playback of the selected digest content. As a result, instead of the display window for the "library mode", the information processing apparatus provides the user with a display window for a "playback mode", which is a mode in which the digest content is played back.

When the user operates an object, such as a predetermined icon, in the display window in the "library mode", the display window changes to a display window for editing the created digest content. As a result, instead of the display window for the "library mode", the information processing apparatus provides the user with a display window for an "edit mode", which is a mode in which the digest content is edited.

When the user operates an object, such as a predetermined icon, displayed in the display window for the "library mode", the information processing apparatus may enter a "create mode", which is a mode for creating digest content.

Figure 3:
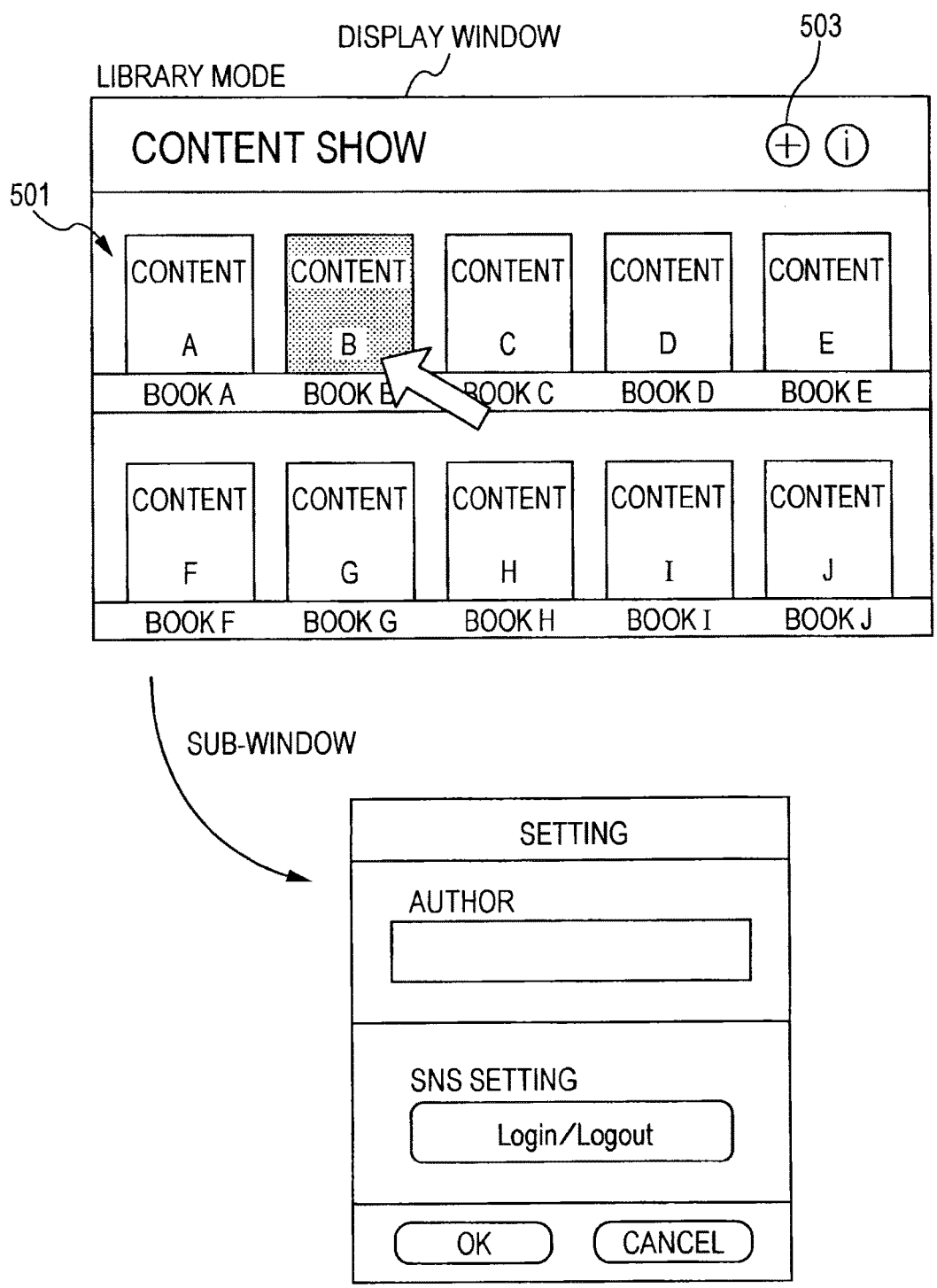
FIG. 3 illustrates the user interface of the information processing apparatus according to the embodiment.

FIG. 3 is a schematic view illustrating one example of the display window in the "library mode".

As illustrated in FIG. 3, thumbnail images 501 for already created digest content are displayed in the display window in the library mode. The thumbnail images 501 may be images selected by the user or may be images automatically created during the automatic creation of the digest content. The thumbnail images 501 may be displayed in different forms, depending on whether the corresponding digest content is present in the local equipment (i.e., the information processing apparatus) or is present in servers on a network.

When the user performs an operation for selecting any of the thumbnail images 501 by operating a position-specifying object, such as an icon, or operating the touch panel, the information processing apparatus enters a mode for playing back the digest content associated with the selected thumbnail image 501. For example, when the user selects a mode for setting a property of the thumbnail image 501 by performing an operation, such as a right click operation of the mouse, a sub-window as illustrated in the lower part of FIG. 3 as one example is displayed. In the sub-window for settings as illustrated in the lower part of FIG. 3, the author of the selected digest content can be input and, for example, SNS (social networking service) settings for sharing the digest content over an SNS network or the like can be set.

When the user selects an object 503 for entering the digest-content create mode, the information processing apparatus enters the "create mode" for creating digest content.

Figure 4:
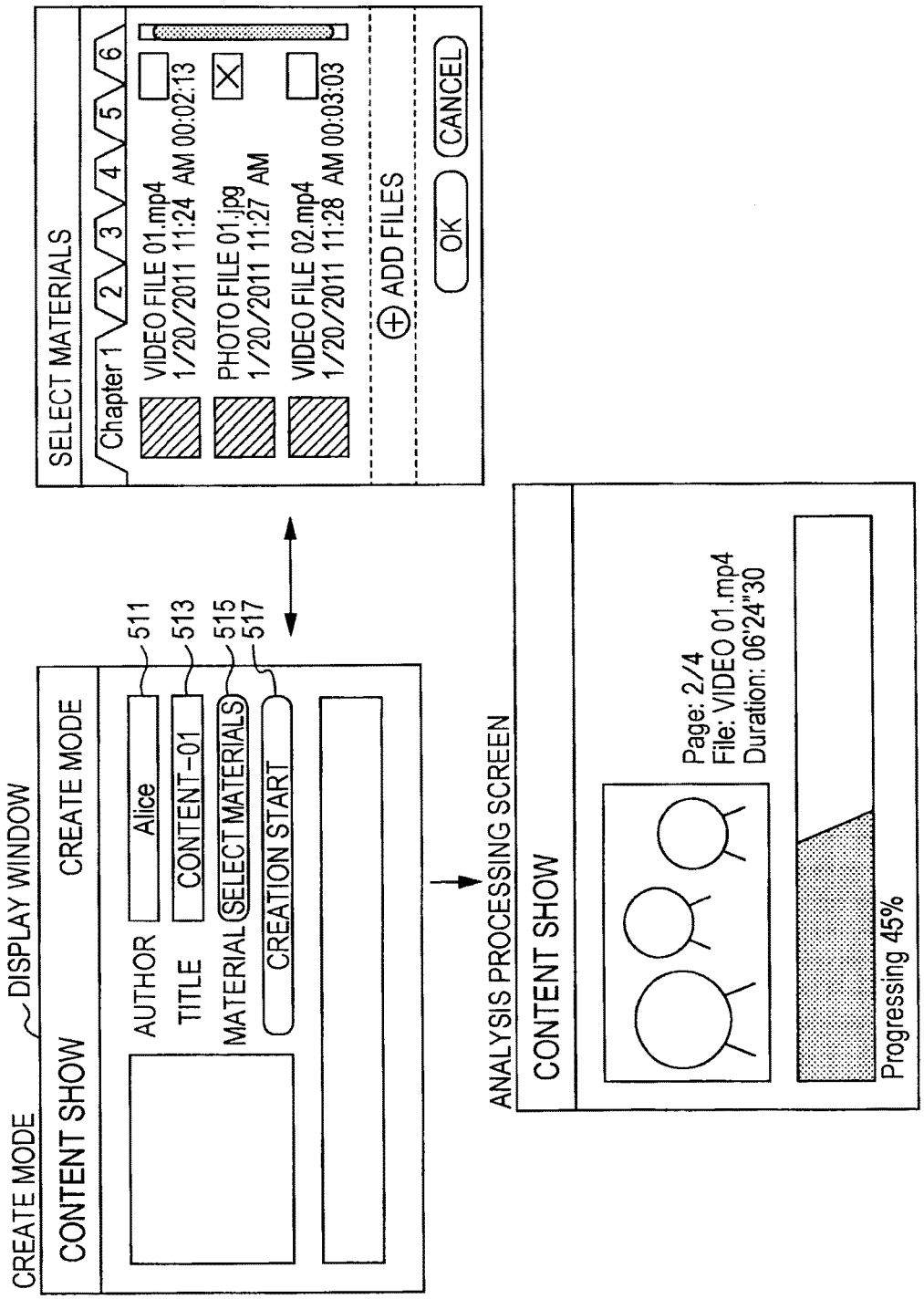
FIG. 4 illustrates the user interface of the information processing apparatus according to the embodiment.

FIG. 4 is a schematic view illustrating one example of the display window for the "create mode".

The display window for the create mode has an author input field 511 in which a character string representing the author of digest content is input and a title input field 513 in which a character string representing the title of the digest content is input. By inputting character strings to the input fields 511 and 513, the user can arbitrary set metadata, such as the author and title of the digest content.

When the user selects a digest-content material-specifying button 515 displayed in the display window for the create mode, a material selection sub-window as illustrated in the upper right part of FIG. 4 is displayed. In the material selection sub-window, still-picture content and/or moving-picture content for use as materials for digest content is specified by a user operation. When the user specifies any content in the sub-window, corresponding digest content is automatically created.

As illustrated in the upper right part of FIG. 4, the user can specify, for each edit unit labeled "Chapter", content that can be used as the materials. The edit unit labeled "Chapter" corresponds to a chapter for the created digest content. In other words, the automatically created digest content can also be regarded as content obtained by coupling pieces of digest content corresponding to the individual chapters in order of chapter number. The number of chapters can be determined as appropriate.

When the user selects content for each chapter, the thumbnail image for the selected content and metadata (e.g., a file name, file-created date, file playback time, and so on) of the content are displayed. A button for deleting selected content, a button for adding content, and so on may also be displayed in the material selection sub-window.

Content used as the materials for the digest content may be specified for each file, as illustrated in FIG. 4, or may be specified for each folder. When content is specified for each folder, all pieces of the content contained in the folder may also be set for use as the materials. Also, when content is specified for each folder, pieces of the content in the folder are typically used as the materials in the order in which the data thereof are created. In this case, the user may specify the order of the pieces of content for use as the materials.

When a creation start button (Creation Start) 517 for specifying start of content creation is operated after the content used for the materials is specified as described above, the display screen changes to an analysis processing screen as illustrated in the lower part of FIG. 4. On the analysis processing screen, the metadata of the content being currently analyzed, a thumbnail image for the content, and an object representing a progress status of the analysis processing may be displayed.

With such an analysis processing screen, digest content as illustrated in FIG. 2 is automatically created. When the analysis processing and the creation of the digest contest are completed, the information processing apparatus may change the screen from the analysis processing screen as illustrated in the lower part of FIG. 4 to the display window for the library mode as illustrated in FIG. 2. Upon completion of the creation of the digest content, the information processing apparatus may change the screen to the display window for the edit mode as illustrated in FIG. 2.

Figure 5:
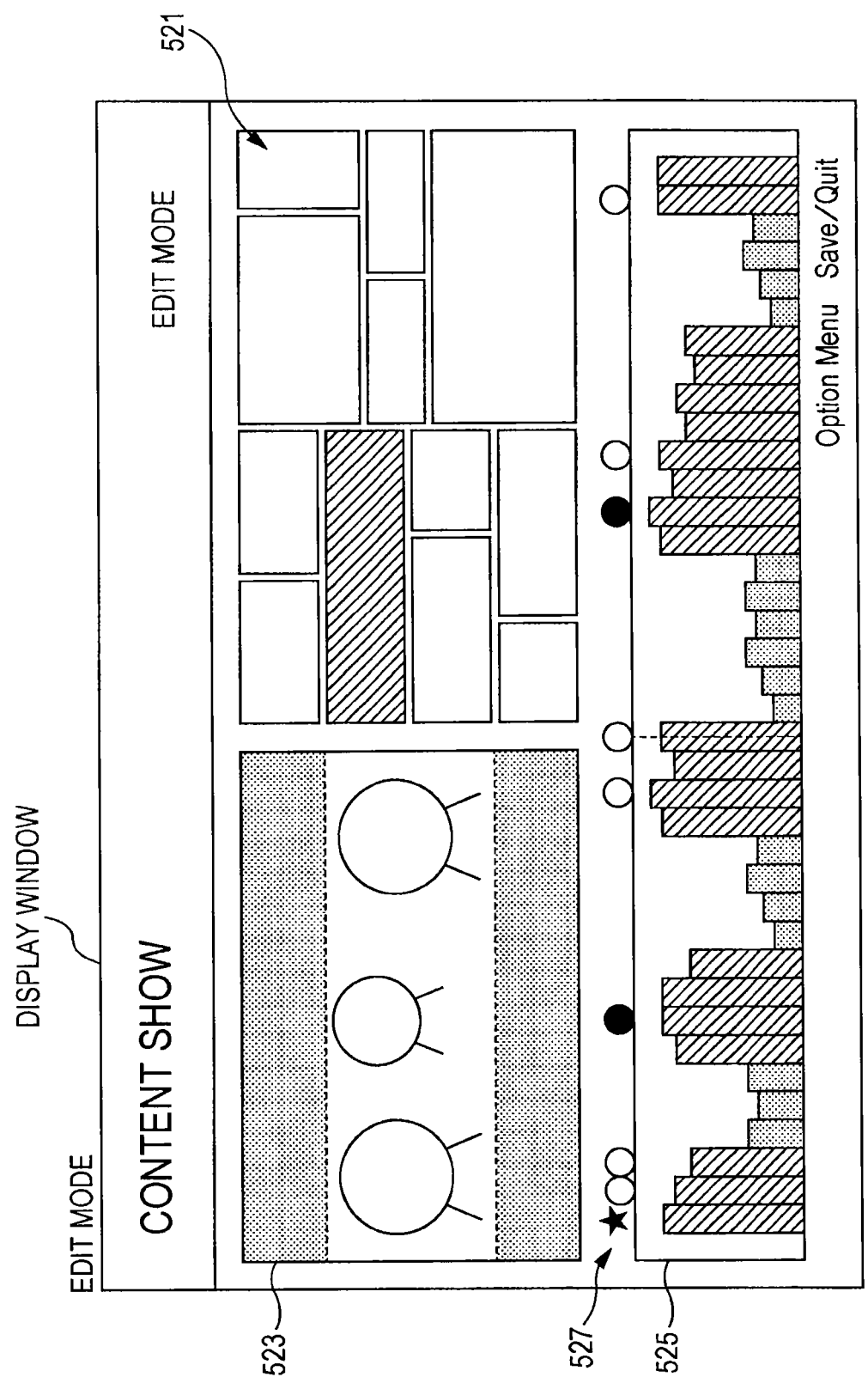
FIG. 5 illustrates the user interface of the information processing apparatus according to the embodiment.

FIG. 5 is a schematic view illustrating one example of the display window for the "edit mode".

The display window for the edit mode includes a preview display region 521 in which a preview of the created digest content is displayed, an image display region 523 in which a frame image (a panel image) associated with a panel of the digest content is displayed, and an amount-of-features display region 525 in which the amounts of features regarding the digest content are displayed (the amounts of features may be expressed by the "digest scores" in Japanese Unexamined Patent Application Publication No. 2010-191934). Objects 527 are displayed along with the amount-of-features display region 525. Examples of the objects 527 include an icon indicating a frame image selected as a panel image, an icon indicating a panel image to which an effect is applied, and an icon indicating a panel image used as a cover image of the digest content.

By referring to the amounts of features, such as the digest scores, displayed in the amount-of-features display region 525, the user can easily determine a highlight of the content he or she is interested in. When one panel is selected in the preview display region 521 or when one of time-sequentially arranged frame images is selected in the amount-of-features display region 525 during selection processing, the image corresponding to the selection is displayed in the image display region 523. Accordingly, the user can easily check details of the image he or she has selected.

Through operation of the preview display region 521, the image display region 523, the amount-of-features display region 525, and the objects 527, the user can freely manipulate the layout of panels in the digest content and the layout of the digest content including frame images and so on associated with the panels.

When an "Option Menu" is selected in the display window for the edit mode as illustrated in FIG. 5, the user can use the "Option Menu" to perform an operation for adding effects, an operation for adding speech balloons and bubbles, and so on.

Figure 6:
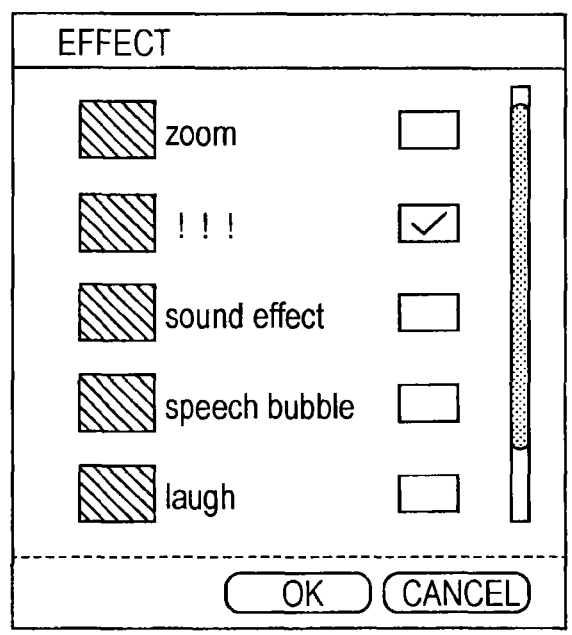
FIG. 6 illustrates the user interface of the information processing apparatus according to the embodiment.

FIG. 6 is a schematic view illustrating one example of a sub-window for adding effects to panel images. As illustrated in FIG. 6, in the sub-window for adding effects, effect names (e.g., "zoom", "sound effects", and so on) and thumbnail images having graphical images corresponding to the effects, and so on are displayed.

Figure 7:
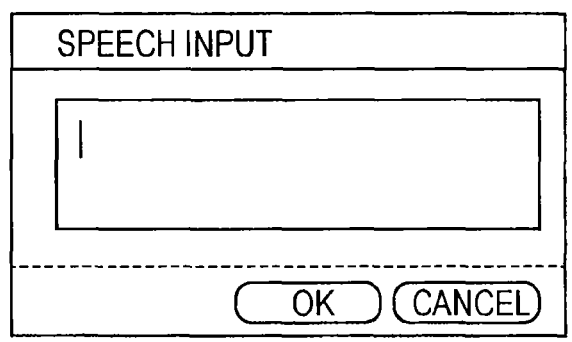
FIG. 7 illustrates the user interface of the information processing apparatus according to the embodiment.

FIG. 7 is a schematic view illustrating one example of a sub-window for adding text data for a speech balloon or bubble to a panel image. As illustrated in FIG. 7, by inputting an arbitrary character string to a text input window, the user can add a speech balloon/bubble effect to a specified panel image. When meta-information accompanying the specified panel image or text automatically input by a voice recognition technology or the like is already shown, the user can edit the meta-information or text.

The "edit mode" in the information processing apparatus is described later in detail.

Figure 8:
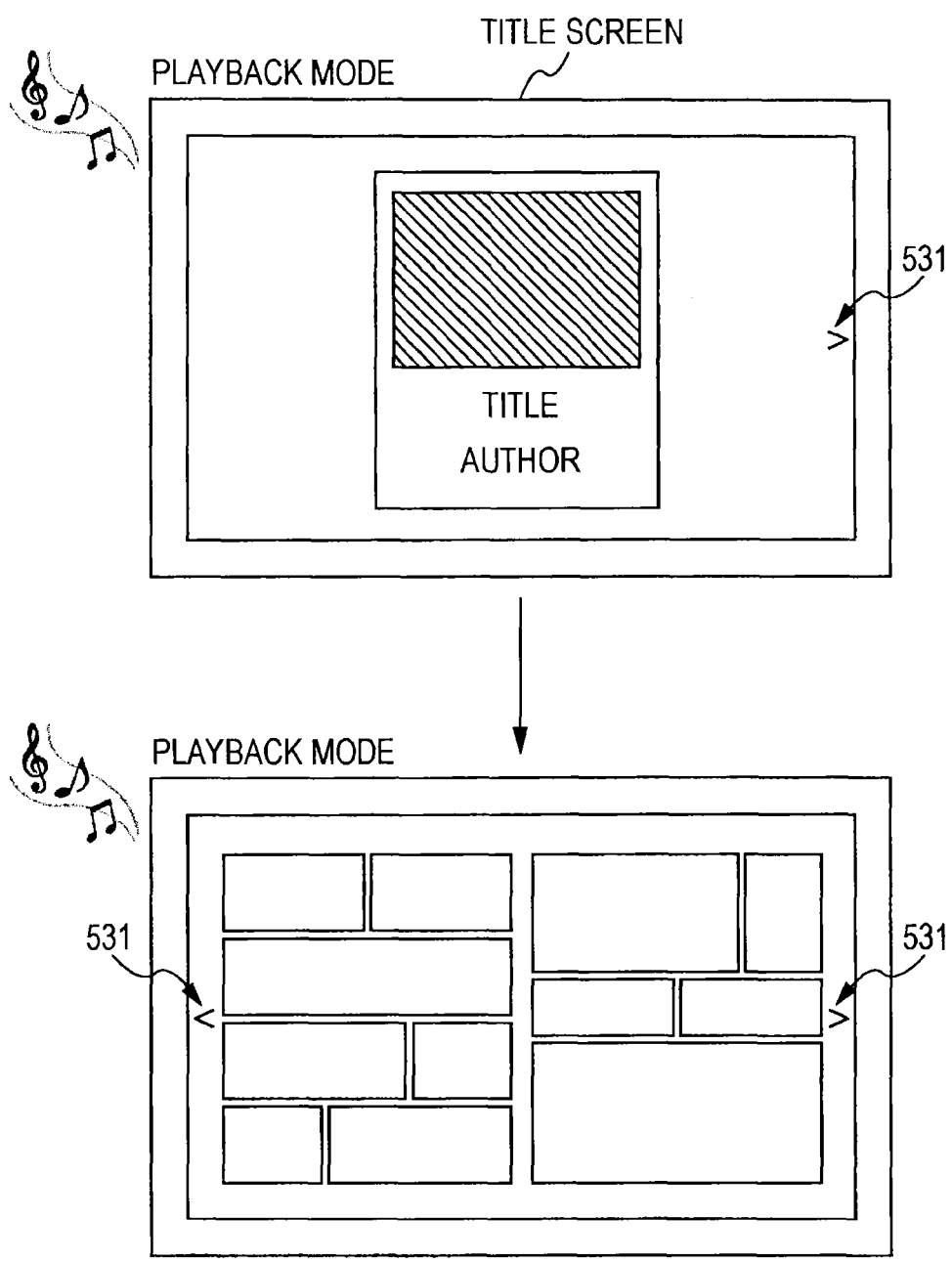
FIG. 8 illustrates the user interface of the information processing apparatus according to the embodiment.

When the thumbnail image 501 associated with the digest content is selected in the display window in the library mode as illustrated in FIG. 3, a title screen as illustrated in FIG. 8 is displayed. In this state, a comic-style page layout for the digest content can be turned upon operation of a page-turning object 531. When the digest content has voice data, the voice data is played back in conjunction with playback of the digest content.

Figure 9:
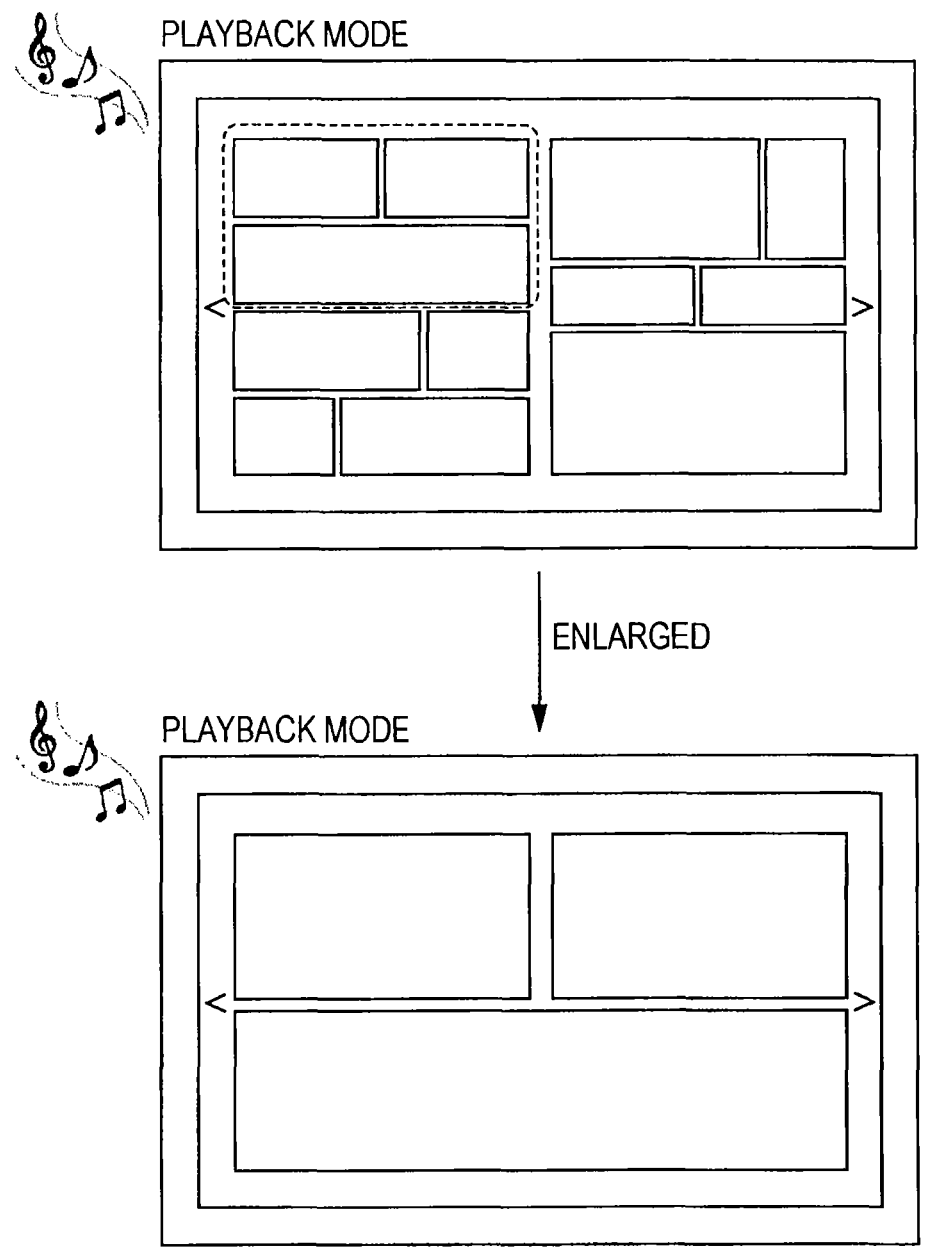
FIG. 9 illustrates the user interface of the information processing apparatus according to the embodiment.

When an operation for displaying the comic-style page layout in an enlarged manner is performed according to a user operation, the size of a panel image displayed changes in conjunction with the user operation. For example, when a user operation for enlargement display on a region surrounded by a dotted line in the upper part of FIG. 9 is performed, an enlarged image of the operated portion is displayed as illustrated in the lower part of FIG. 9.

Figure 10:
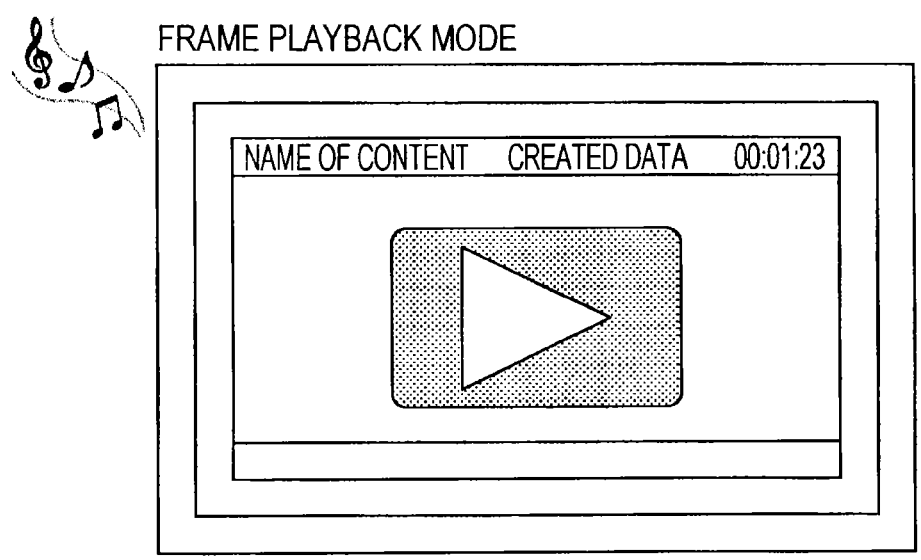
FIG. 10 illustrates the user interface of the information processing apparatus according to the embodiment.

When a panel image is selected or when a maximum enlargement ratio is selected, the information processing apparatus enters a frame playback mode as illustrated in FIG. 10. In the frame playback mode, the moving picture of a content segment corresponding to the panel image is played back. In the frame playback mode, meta data, such as the name of the content, data-created date, and playback time, are also displayed on the display screen, as illustrated in FIG. 10.

One example of the user interface provided by the information processing apparatus according to the present embodiment has been briefly described above with reference to FIGS. 2 to 10.

<Configuration of Information Processing Apparatus>

Next, the configuration of the information processing apparatus according to the present embodiment, the information processing apparatus providing a user interface as described above, will be described in detail with reference to FIGS. 11 to 21. Main data of digest content having a comic-style page layout will be referred to as "comic representation data" hereinafter.

Figure 11:
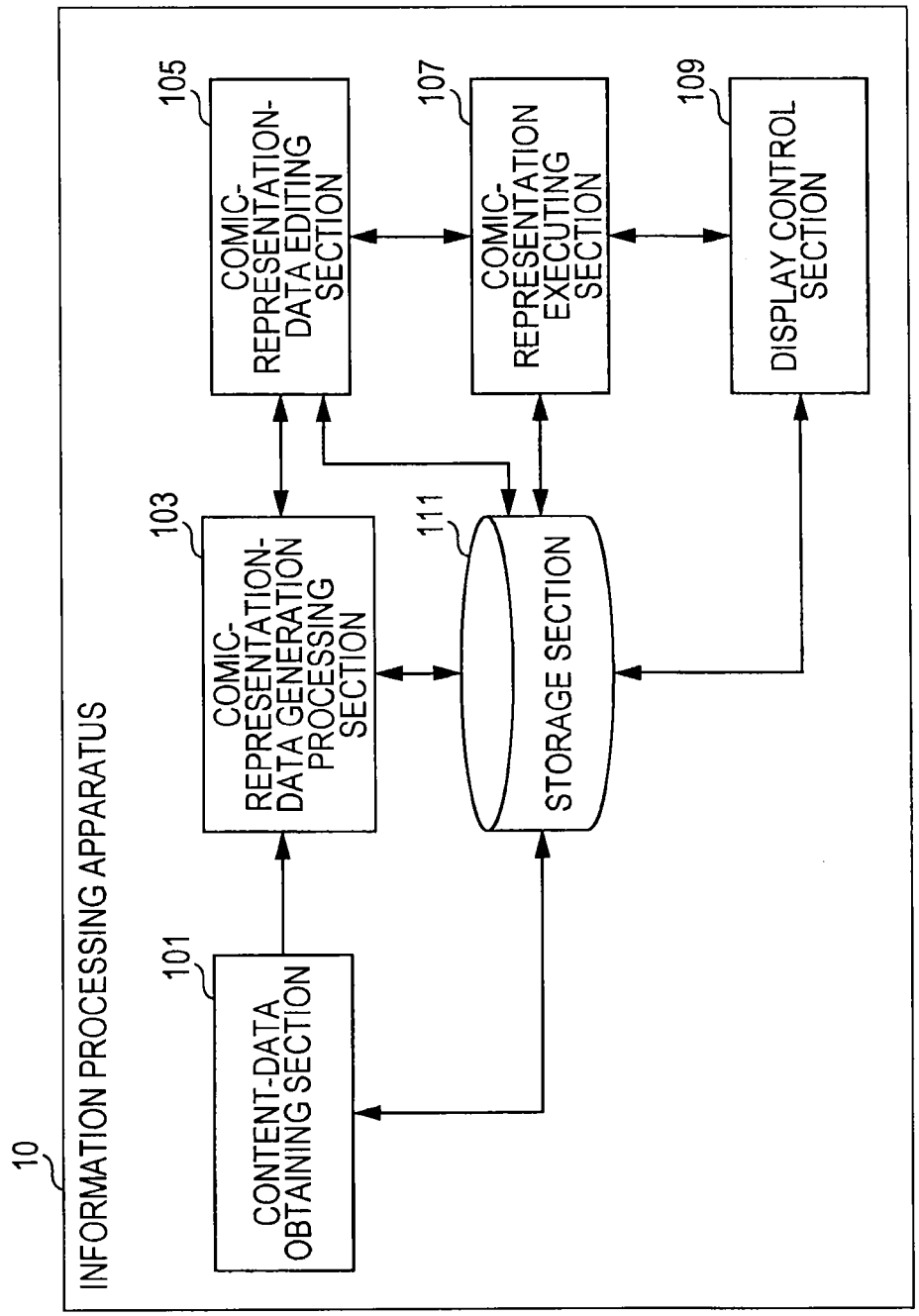
FIG. 11 is a block diagram illustrating one example of the configuration of the information processing apparatus according to the embodiment.

FIG. 11 is a block diagram illustrating one example of the configuration of an information processing apparatus 10 according to the present embodiment. As illustrated in FIG. 11, the information processing apparatus 10 according to the present embodiment generally includes a content-data obtaining section 101, a comic-representation-data generation processing section 103, a comic-representation-data editing section 105, a comic-representation executing section 107, a display control section 109, and a storage section 111. Those processing sections function in cooperation with each other to provide an application having the user interface as illustrated in FIGS. 2 to 10.

The content-data obtaining section 101 is realized by, for example, a CPU (central processing unit), a ROM (read only memory), a RAM (random access memory), an input device, and a communication device. In accordance with a user operation performed on the information processing apparatus 10, the content-data obtaining section 101 obtains main data (content data) corresponding to content, such as moving-picture content or still-picture content, specified by the user, from the storage section 111, a recording medium inserted into the information processing apparatus 10, a computer that is connected to a network or the like and that is capable of communicating with the information processing apparatus 10, or the like.

The "content data for the moving-picture content" as used herein refers to main data of a moving picture including multiple images and sound with which time information is associated. The "content data for the still-picture content" is assumed to be data with which time information regarding time at which the still-picture data is created is associated.

The content-data obtaining section 101 outputs the obtained content data, such as the moving-picture content or still-picture content, to the comic-representation-data generation processing section 103. The content-data obtaining section 101 may also associate time information, such as date and time when the content data is obtained, with the obtained content data, and store the associated data in the storage section 111 or the like as history information.

The comic-representation-data generation processing section 103 is realized by, for example, a CPU, a ROM, a RAM, and an input device. The comic-representation-data generation processing section 103 may employ, for example, the method disclosed in Japanese Unexamined Patent Application Publication No. 2010-191934 to generate comic representation data having a comic-style page layout as illustrated in FIG. 1. The generation processing of the comic representation data is not limited to the method disclosed in Japanese Unexamined Patent Application Publication No. 2010-191934, and may be realized using any other suitable method. Examples of such a method include a method in which a layout is semi-automatically set using panel images selected by a user and a method in which a user arranges panel images in accordance with a template layout to generate comic representation data. The user may set the layout (assignment) of the panels and set all the panel images to generate comic representation data.

Figure 12:
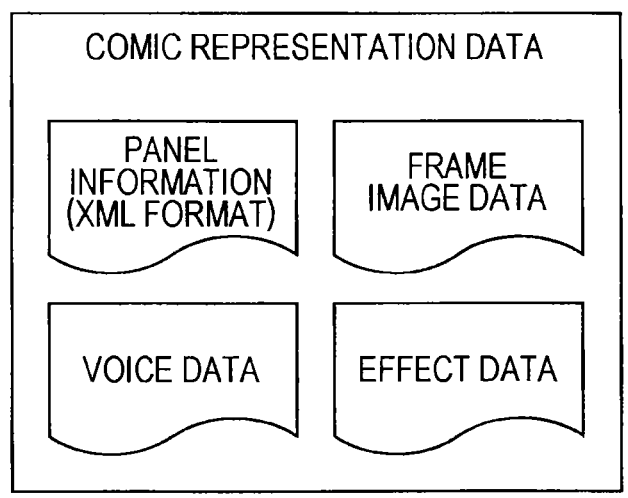
FIG. 12 illustrates one example of comic representation data in the embodiment.

When the comic-representation-data generation processing section 103 uses the method disclosed in Japanese Unexamined Patent Application Publication No. 2010-191934 to generate comic representation data, the generated comic representation data has a collection of data as illustrated in FIG. 12. The comic representation data may include, at least, panel information written in an XML (eXtensible Markup Language) format or the like, frame image data, voice data, and effect data, as illustrated in FIG. 12. The information processing apparatus 10 and other apparatuses can generate comic representation data in various applications by reading and displaying the panel information written in the XML format or the like.

For example, comic representation can be realized in standalone network applications using Visual C++ (registered trademark) or the like, mobile applications for Java BREW and so on, and browser applications using Flash, JavaScript, and so on. For example, a file (SWF (small web format) file) for Flash may be created using ActionScript and panel information, which may be comic-image arrangement information in the XML, may be read. In such a case, a comic representation screen can be viewed using a typical web browser.

In addition, the comic representation data may be created using Flash so as to allow for more interactive content representation. For example, the creation of the comic representation data by using Flash makes it possible to realize an implementation for turning the page with a button, turning the page by scrolling with a mouse wheel, or the like.

In addition, the panels may be time-sequentially displayed with animation. In such a case, even when a large number of panels exist, the user can smoothly continue reading without wondering the order of the panels. When a thumbnail image is clicked for playback of sound, transparencies of all panels other than the clicked panel may be increased so that the panel currently played back can be highlighted for easier recognition. Since the panel information is output as a file in the XML format in the manner described above, the panel information can be referred to from various applications such as a Flash-based application.

The comic-representation-data generation processing section 103 may store the generated comic representation data in the storage section 111 or the like or may output the generated comic representation data to the comic-representation-data editing section 105. The comic-representation-data generation processing section 103 may store the generated comic representation data on various types of recording medium, such as a CD-ROM, DVD-ROM, or Blu-ray Disc, or in various types of flash memory, such as a USB memory. The comic-representation-data generation processing section 103 may also supply the generated comic representation data to another information processing apparatus through a communications network, such as the Internet.

The comic-representation-data editing section 105, which is one example of an edit processing section, is realized by, for example, a CPU, a ROM, a RAM, and an input device. In accordance with a user operation, the comic-representation-data editing section 105 edits at least one of the layout of panels in the comic representation data and the arrangement of frame images on the panels with respect to the pre-created digest content (the comic representation data).

During the layout-edit processing performed by the comic-representation-data editing section 105, the display region of the comic-style page layout displayed in the preview display region 521 as illustrated in FIG. 5 is pre-sectioned into one or more edit-unit tiers. When a user operation for the layout of panels or the arrangement of images on the panels is performed on one of the panels in the display region or a portion between mutually adjacent ones of the panels, the comic-representation-data editing section 105 can re-set the layout of the panels or the arrangement of the images on the panels in the edit-unit tier to which the panel or the inter-panel portion on which the user operation is performed belongs.

There are also cases in which, during re-setting of the comic-style page layout, the comic-representation-data editing section 105 performs processing, such as processing for re-setting the layout of the panels or processing for selecting panel images, performed by the comic-representation-data generation processing section 103. In such a case, the comic-representation-data editing section 105 can perform the layout-edit processing in cooperation with the comic-representation-data generation processing section 103.

The edit-unit tier may be defined for each page in the comic-style page layout or may also be defined across multiple pages. The edit-unit tier may also be defined for each block including one or more panels. Such an edit-unit tier may be arbitrarily set according to, for example, a user operation or an initial setting value of the information processing apparatus 10 according to the present embodiment.

More specifically, in accordance with a user operation, the comic-representation-data editing section 105 may execute the following edit processing:

Replacement of Panel Image
Addition and Deletion of Panel
Change of Panel Shape
Modification of Display Region (Cropped Region) of Panel Image
Addition/Removal of Effect to/from Panel
Selection/Change of Theme for Entire Layout The edit processing will be specifically described below with reference to FIGS. 13A to 21.

[Replacement of Panel Image]

First, replacement processing of panel images will be specifically described with reference to FIGS. 13A to 14B.

Figure 13A:
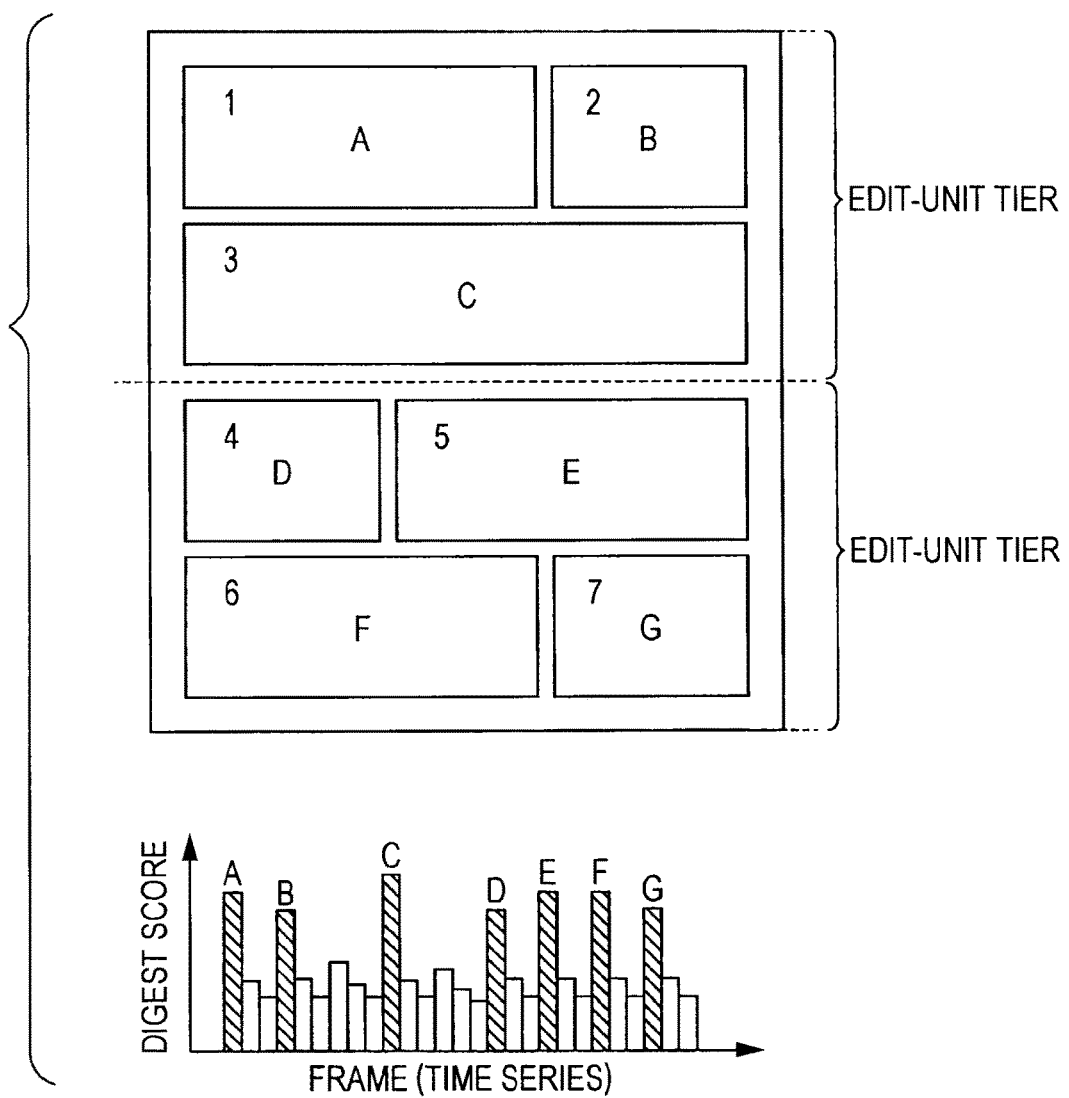
FIG. 13A illustrates layout-edit processing for the comic representation data in the embodiment.
Figure 13B:
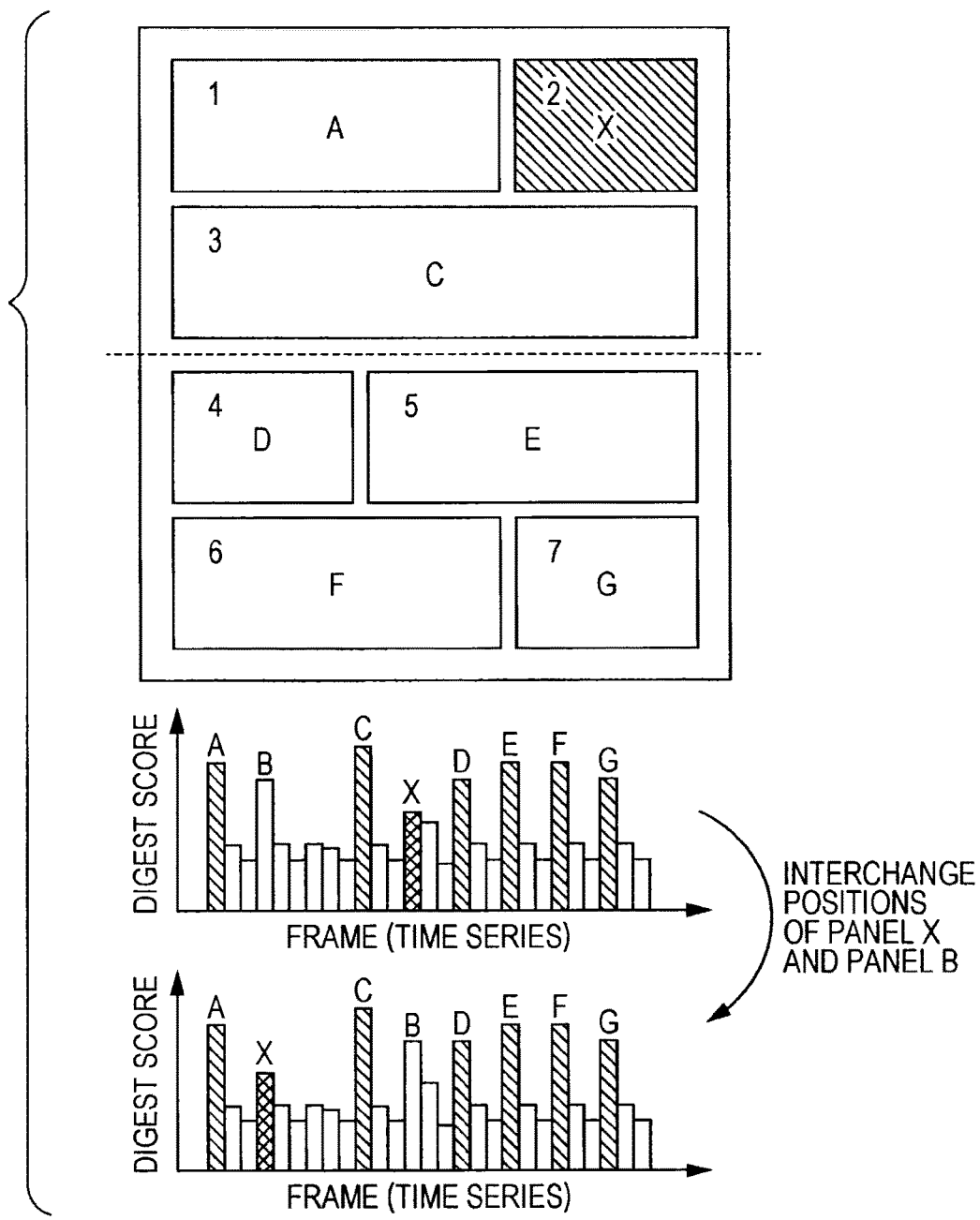
FIG. 13B illustrates layout-edit processing for the comic representation data in the embodiment.

Attention is given to a case in which, as illustrated in FIG. 13A, a layout of one page having seven panels is included in the comic representation data and seven frame images for panel images A to G are assigned to the panels. The frame images associated with this layout are assumed to have digest scores as illustrated in the lower graph of FIG. 13A. In this case, it is assumed that two edit-unit tiers are set with their border located at the center position of the layout in the vertical direction. A description will be given of a case in which, in such a layout, a user operation is performed to replace the panel image B assigned to a panel 2 with a panel image X that is located subsequent to the panel image B in the time-series transition, as illustrated in FIG. 13B or 13C.

When the comic-representation-data editing section 105 performs processing for replacing a panel image associated with a panel specified by a user operation, two types of replacement method can be used depending on how to handle the time-series relationship between a pre-replacement panel image and a post-replacement panel image. That is, the comic-representation-data editing section 105 can execute two types of processing: (1) processing for replacing the panel image without maintaining the time-series transition in a set of original content of the comic representation data and (2) processing for replacing the panel image while maintaining the time-series transition in a set of original content of the comic representation data.

Which of the two types of processing the comic-representation-data editing section 105 is to execute may be preset during initial setting or the like or may be set each time a user operation is performed.

For replacing the panel images without maintaining the time-series transition as in the processing (1) described above, the comic-representation-data editing section 105 may simply replace the panel image B, associated with the panel specified by the user operation, with the panel image X, specified by the user operation.

As illustrated in FIG. 13B, the comic-representation-data editing section 105 may change the order of display of the digest scores in order to achieve a match between the display in the amount-of-features display region in which the digest scores are time-sequentially displayed and the time-series transition in the layout of panels in the comic-style page layout. In other words, in the example illustrated in FIG. 13B, in order to achieve a match with the arrangement of the digest scores displayed in the amount-of-features display region, the position of the pre-replacement panel image B and the position of the post-replacement panel image X may be interchanged.

For replacing the panel image while maintaining the time-series transition as in the processing (2) described above, the comic-representation-data editing section 105 performs the panel-image replacement processing by further using a panel image that is located subsequent to the post-replacement panel image X in the time series transition, as illustrated in FIG. 13C. That is, in the case of FIG. 13C, the comic-representation-data editing section 105 replaces the panel image B, specified by the user operation, with the panel image X. The comic-representation-data editing section 105 also achieves a match in the time-series transition between the post-replacement panel image X and a panel image associated with the panel 3. In the case of the example illustrated in FIG. 13C, since the panel 4 and subsequent panels belong to a different edit-unit tier, the comic-representation-data editing section 105 achieves a match in the time-series transition by using the panel image located subsequent to the panel image X and prior to the panel image D. As a result, the comic-representation-data editing section 105 selects, for example, the panel Y as the panel image to be associated with the panel 3.

A case in which the panel-image replacement processing is executed on the panels 2 and 3 while the sizes of the panels are maintained is illustrated in the example in FIG. 13C. However, the comic-representation-data editing section 105 may re-set the layout involving the sizes of the panels in the edit-unit tier by using the values of the digest scores associated with the post-replacement images (which correspond to the images X and Y in the example of FIG. 13C). In this case, the comic-representation-data editing section 105 re-sets the sizes of the panels in cooperation with the comic-representation-data generation processing section 103.

Figure 14B:
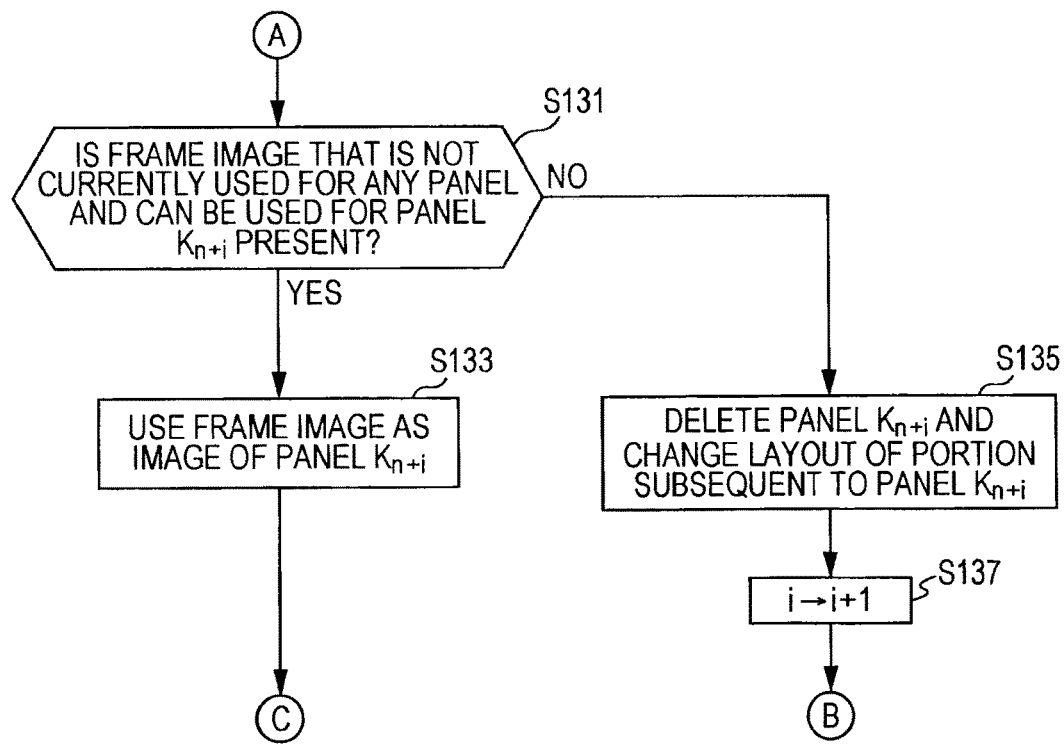
FIG. 14B is a flowchart illustrating one example of the flow of the replacement processing for the panel image in the embodiment.

FIGS. 14A and 14B are flow diagrams illustrating the flow of processing (2) for replacing the panel images while maintaining the time-series transition.

When a panel $K_n$ on which the replacement processing is to be performed and a new frame image X are selected according to a user operation, in step S101, the comic-representation-data editing section 105 selects the panel $K_n$ to be replaced from the comic representation data. In step S103, the comic-representation-data editing section 105 selects the new frame image X.

Subsequently, in step S105, the comic-representation-data editing section 105 determines whether or not the value of a parameter n for specifying a panel is 0. When the parameter n is not 0, the process proceeds to step S107 in which the comic-representation-data editing section 105 determines whether or not there is a consistency in a time-series relationship between a frame image $A(K_{n-1})$ of a panel $K_{n-1}$ and the frame image X. When there is a consistency, the process proceeds to step S109 in which the comic-representation-data editing section 105 determines whether or the parameter n is a last value. When the parameter n is the last value, the comic-representation-data editing section 105 executes step S113 described below. When the parameter n is not the last value, the process proceeds to step S111 in which the comic-representation-data editing section 105 determines whether or not there is a consistency in the time-series relationship between a frame image $C(K_{n+1})$ of a panel $K_{n+1}$ and the frame image X. When there is a consistency, the process proceeds to step S113 in which the comic-representation-data editing section 105 replaces the image of the panel $K_n$ with the image X. As a result, the processing for replacement with the panel image X specified by the user operation ends.

On the other hand, when it is determined in step S107 that there is no consistency in the time-series relationship between the frame image $A(K_{n-1})$ of the panel $K_{n-1}$ and the frame image X, the process proceeds to step S121 in which the comic-representation-data editing section 105 determines whether or not a frame image that is not currently used for any panel and can be used for the panel $K_{n-1}$ is present. In the presence of such a frame image, the process proceeds to step S123 in which the comic-representation-data editing section 105 uses the frame image as the image of the panel $K_{n-1}$. Thereafter, the comic-representation-data editing section 105 executes the processing in step S109. In the absence of a frame image that is not currently used for any panel and can be used for the panel $K_{n-1}$, the process proceeds to step S125 in which the comic-representation-data editing section 105 deletes the panel $K_{n-1}$ and changes the layout of the portion prior to the panel $K_{n-1}$. Thereafter, the comic-representation-data editing section 105 reduces "1" from the value of a parameter i in step S127 and then executes the processing in step S105.

When it is determined in step S111 that there is no consistency in the time-series relationship between the frame image $C(K_{n+1})$ of the panel $K_{n+1}$ and the frame image X, the process proceeds to step S131 in which the comic-representation-data editing section 105 determines whether or not a frame image that is not currently used for any panel and can be used for the panel $K_{n+1}$ is present. In the presence of such a frame image, the process proceeds to step S133 in which the comic-representation-data editing section 105 uses the frame image as the image of the panel $K_{n+1}$. Thereafter, the comic-representation-data editing section 105 executes the processing in step S113. In the absence of a frame image that is not currently used for any panel and can be used for the panel $K_{n+1}$, the process proceeds to step S135 in which the comic-representation-data editing section 105 deletes the panel $K_{n+1}$ and changes the layout of the portion subsequent to the panel $K_{n+1}$. Thereafter, the comic-representation-data editing section 105 adds "1" to the value of the parameter i in step S137 and then executes the processing in step S109.

By performing the processing according to a flow as described above, the comic-representation-data editing section 105 can perform the panel-image replacement, which is edit processing.

[Addition of Panel]

Next, panel-addition processing will be specifically described below with reference to FIGS. 15A to 16.

Figure 15A:
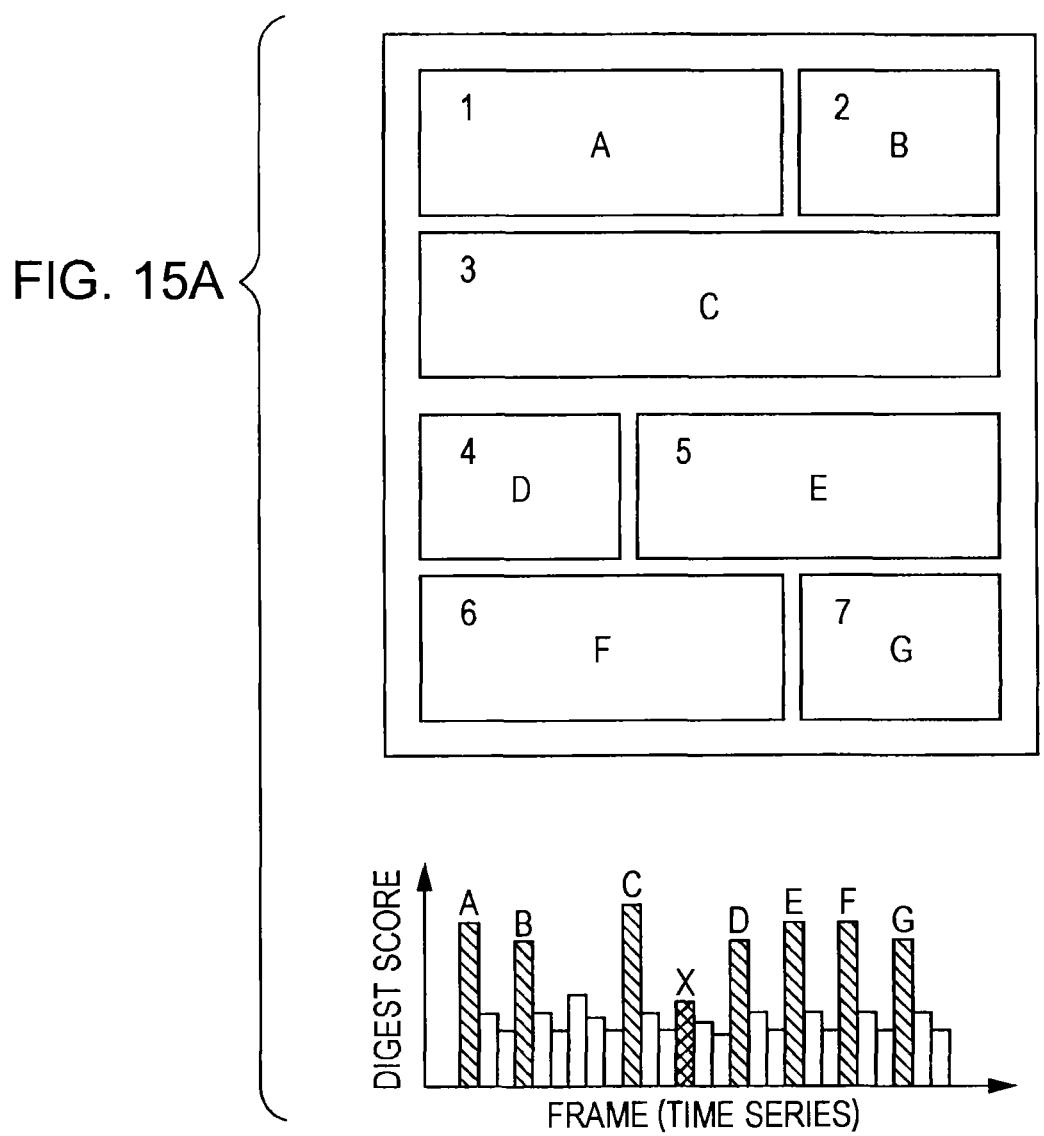
FIG. 15A illustrates layout-edit processing for the comic representation data in the embodiment.

Attention is given to a case in which, as illustrated in FIG. 15A, the layout of one page having seven panels is contained in the comic representation data and seven frame images for panel images A to G are assigned to the panels. The frame images associated with this layout are assumed to have digest scores as illustrated in the lower graph of FIG. 15A.

A description will first be given of a case in which, in such a layout, the user selects the digest score of an image X in the amount-of-features display region and performs an operation for adding the image X. In other words, the panel addition processing described below is edit processing for adding, as a new panel, a frame image selected by the user to a comic-style page layout.

Figure 15D:
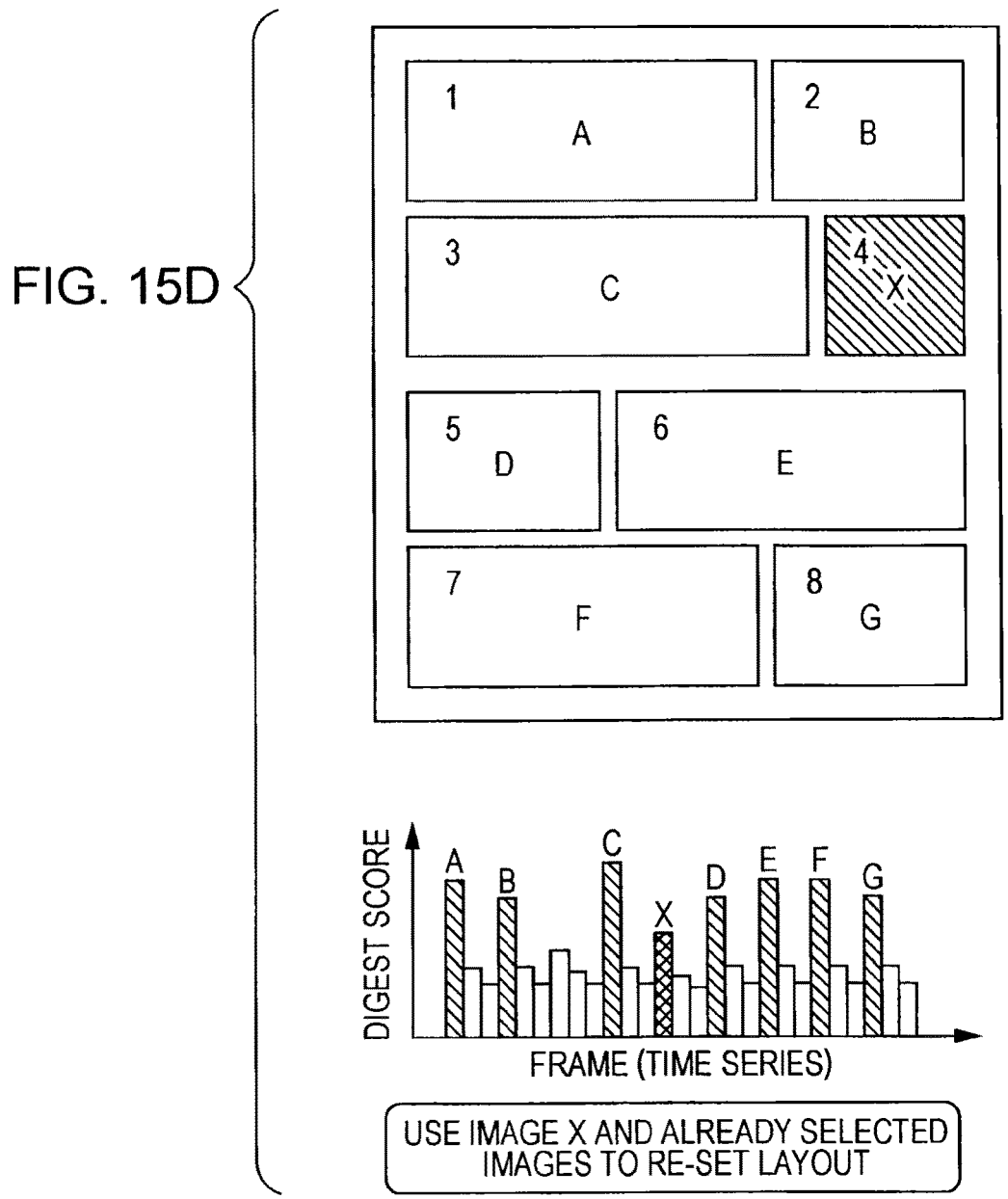
FIG. 15D illustrates layout-edit processing for the comic representation data in the embodiment.

For executing processing for adding a frame image in a state as described above, the comic-representation-data editing section 105 may employ any of three types of method illustrated in FIGS. 15B to 15D.

In panel addition processing illustrated in FIG. 15B, the comic-representation-data editing section 105 increases the digest score of the frame image selected by the user operation to be larger than or equal to at least a threshold used for determining whether or not the panel is to be used and then executes re-layout processing. In the description below, it is assumed that the entire page of the comic-style page layout illustrated in FIG. 15B belongs to a single edit-unit tier.

In the case illustrated in FIG. 15B, since the number of panels in the layout is 7, the comic-representation-data editing section 105 selects seven frame images having digest scores that are larger than or equal to the aforementioned threshold. In the example illustrated in FIG. 15B, since the digest score of the frame image B has a smaller value than the digest score of the frame image X, seven frame images A, C, X, D, E, F, and G are selected. Thus, in this case, the comic-representation-data editing section 105 changes the image to be associated with the panel 2 from the image B to the image C and also changes the image to be associated with the panel 3 from the image C to the image X.

In panel addition processing illustrated in FIG. 15C, the comic-representation-data editing section 105 designates, as a first edit-unit tier, the area up to the position immediately before the frame image selected by the user operation, designates, as a second edit-unit tier, the area immediately after the frame image selected by the user operation, and performs re-setting of the layout of panels and re-setting of the frame images associated with the panels in each edit-unit tier. In this case, the comic-representation-data editing section 105 handles the frame image selected by the user operation so that it belongs to either the first edit-unit tier or the second edit-unit tier to re-set the layout.

In the example illustrated in FIG. 15C, the comic-representation-data editing section 105 designates the frame images A to X in the amount-of-features display region as a first edit-unit tier, designates the frame images present immediately after the frame image X as a second edit-unit tier, and performs re-setting of the layout of the panels and re-setting of the frame images associated with the panels. As a result, four frame images A, B, C, and X are selected in the first edit-unit tier, as illustrated in the upper part of FIG. 15C, and the comic-representation-data generation processing section 103 re-sets the sizes of the panels in accordance with the values of the digest scores associated with the four images. In the second edit-unit tier, four frame images D, E, F, and G are selected as in the panels selected before the addition of the panel.

In an example illustrated in FIG. 15D, the comic-representation-data editing section 105 uses only the frame image X selected by the user operation and already selected seven frame images (the images A to G) to re-set the layout while maintaining the time-series transition. In this case, it is assumed that one entire page illustrated in the upper part of FIG. 15D is set in one edit-unit tier.

In the example illustrated in FIG. 15D, the comic-representation-data editing section 105 selects eight frame images A, B, C, X, D, E, F, and G and the comic-representation-data generation processing section 103 re-sets the sizes of the panels in accordance with the values of the digest scores associated with the eight frame images.

Thus, when panel addition is specified by a user operation, the comic-representation-data editing section 105 can execute the panel addition processing by using one of the above-described three types of method.

Figure 16:
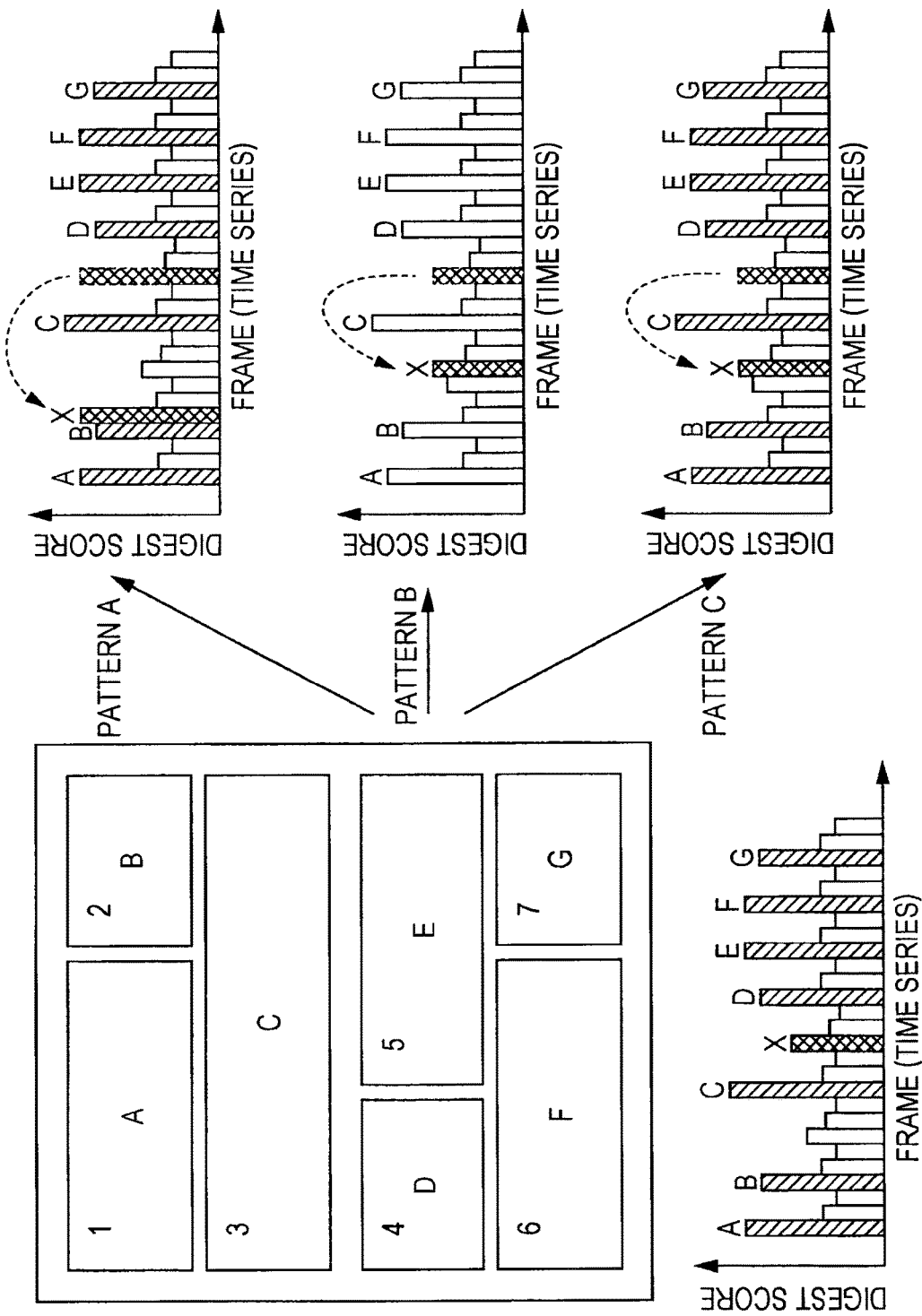
FIG. 16 illustrates layout-edit processing for the comic representation data in the embodiment.

Another conceivable example is a case in which addition of a specific image to a specific position is specified by the user operation, as illustrated in FIG. 16. FIG. 16 illustrates an example for processing when the user performs an operation for adding a frame image X to a portion between the panel 2 and the panel 3.

In this case, since addition of the panel image X to a portion between the panel 2 and the panel 3 is specified by the user operation, the comic-representation-data editing section 105 moves the panel image X to an arbitrary position between the panel image B and the panel image C in order to achieve a time-series match in the amount-of-features display region. Thereafter, the comic-representation-data editing section 105 executes processing for adding the frame image X on the basis of one of the three types of method illustrated as patterns A to C illustrated in FIG. 16.

In the processing for pattern A illustrated in FIG. 16, after the frame images are rearranged so as to correspond to the panel sequence specified by the user operation, the digest-score increasing processing as illustrated in FIG. 15B is performed and a specific image is added to a specific panel position.

In the processing for pattern B illustrated in FIG. 16, after the frame images are rearranged so as to correspond to the panel sequence specified by the user operation, two edit-unit tiers are set before and after the image specified by the user, as described in FIG. 15C, and then at least the selection of the panel images is re-set in each edit-unit tier. In this case, it is preferable that the comic-representation-data editor 105 re-change the panel sequence so that the image X specified by the user is positioned at substantially the center of the frame images (the images B and C in the case of FIG. 16) for the panels (the panels 2 and 3) adjacent to the specified inter-panel position. The image specified by the user may also be placed at either the last position in the first edit-unit tier or the first position in the second edit-unit tier.

In the processing for pattern C illustrated in FIG. 16, after the frame images are rearranged so as to correspond to a panel sequence specified by a user operation, the layout is re-set using only the image specified by the user and already selected images, as illustrated in FIG. 15D.

By performing the processing for one of patterns A to C, the comic-representation-data editing section 105 can add the image specified by the user to a position specified by the user.

[Deletion of Panel]

Next, panel-deletion processing will be specifically described with reference to FIGS. 17A to 17D.

Attention is given to a case in which, as illustrated in FIG. 17A, the layout of one page having seven panels is contained in the comic representation data and seven frame images for panel images A to G are assigned to the panels. The frame images associated with this layout are assumed to have digest scores as illustrated in the lower graph of FIG. 17A. A description will be given of a case in which, in such a layout, the user selects the panel D and performs an operation for deleting the selected panel D.

For executing processing for deleting a panel in a state as described above, the comic-representation-data editing section 105 may employ any of three types of method illustrated in FIGS. 17B to 17D.

In panel deletion processing illustrated in FIG. 17B, the comic-representation-data editing section 105 reduces the digest score of the frame image for a panel selected by a user operation to be smaller than at least the threshold used for determining whether or not the panel is to be used and then executes re-layout processing. In the description below, it is assumed that the entire page of the comic-style page layout illustrated in FIG. 17B belongs to a single edit-unit tier.

In the example illustrated in FIG. 17B, when the frame images whose digest scores are larger than or equal to the threshold are assumed to be seven frame images A, B, Y, C, E, F, and G, the comic-representation-data editing section 105 selects the seven frame images as panel images used for the comic-style page layout. In addition, the comic-representation-data editing section 105 outputs the digest scores of the selected images to the comic-representation-data generation processing section 103 and requests for re-setting of the layout of the panels. As a result of such processing, a new layout as illustrated in the upper part of FIG. 17B is generated.

In panel deletion processing illustrated in FIG. 17C, the comic-representation-data editing section 105 designates, as a first edit-unit tier, the area up to the position immediately before the frame image selected by the user operation, designates, as a second edit-unit tier, the area immediately after the frame image selected by the user operation, and performs re-setting of the layout of the panels and re-setting of the frame images associated with the panels in one of the first and second edit-unit tiers.

In the example illustrated in FIG. 17C, the comic-representation-data editing section 105 designates the frame image A to a position immediately before the panel image D in the amount-of-features display region as a first edit-unit tier, designates the frame images present immediately after the frame image D in the amount-of-features display region as a second edit-unit tier, and performs re-setting of the layout of the panels and re-setting of the frame images associated with the panels in one of the edit-unit tiers.

It is now assumed that re-setting of the layout of the panels and re-setting of the frame images associated with the panels have been performed in the second edit-unit tier. In this case, when the digest scores of the four frames E, F G, and H in FIG. 17C are assumed to be larger than or equal to the threshold, the comic-representation-data editing section 105 selects the four frame images as panel images. In addition, the comic-representation-data editing section 105 outputs the digest scores of the selected images to the comic-representation-data generation processing section 103 and requests for re-setting the layout of the panels. As a result of such processing, a new layout as illustrated in the upper part of FIG. 17C is generated.

In an example illustrated in FIG. 17D, the comic-representation-data editing section 105 deletes a frame image selected by a user operation from already selected seven frame images (the images A to G) and uses only the remaining frame images to re-set the layout while maintaining the time-series transition. In this case, it is assumed that one entire page illustrated in the upper part of FIG. 17D is set in one edit-unit tier.

In the example illustrated in FIG. 17D, the comic-representation-data editing section 105 selects six frame images A, B, C, E, F, and G and the comic-representation-data generation processing section 103 re-sets the sizes of the panels in accordance with the values of the digest scores associated with the six frame images.

Thus, when panel deletion is specified by a user operation, the comic-representation-data editing section 105 can execute the panel deletion processing by using one of the above-described three types of method.

[Change of Panel Shape]

Next, panel-shape change processing will be specifically described below with reference to FIGS. 18A to 18C.

Attention is given to a case in which, as illustrated in FIG. 18A, the layout of one page having seven panels is contained in the comic representation data and seven frame images for panel images A to G are assigned to the panels. The frame images associated with this layout are assumed to have digest scores as illustrated in the lower graph of FIG. 18A. A description will be given of a case in which, in such a layout, the user selects the panel D and performs an operation for changing the shape of the selected panel D.

While a description below is given of a case in which the user performs a user operation for enlarging the size of the panel D, the comic-representation-data editing section 105 can also perform processing in the same manner, even in a case in which the user performs a user operation for reducing the size of the panel.

In this case, for changing the shape of the panel, the user can specify the shape of the panel by, for example, specifying one of vertices of the panel and performing a drag operation. The user may also use numeric values to specify each vertex of the panel. Thus, a method for allowing the user to specify the panel shape to be changed is not particularly limiting and may be implemented by any suitable method.

Figure 18C:
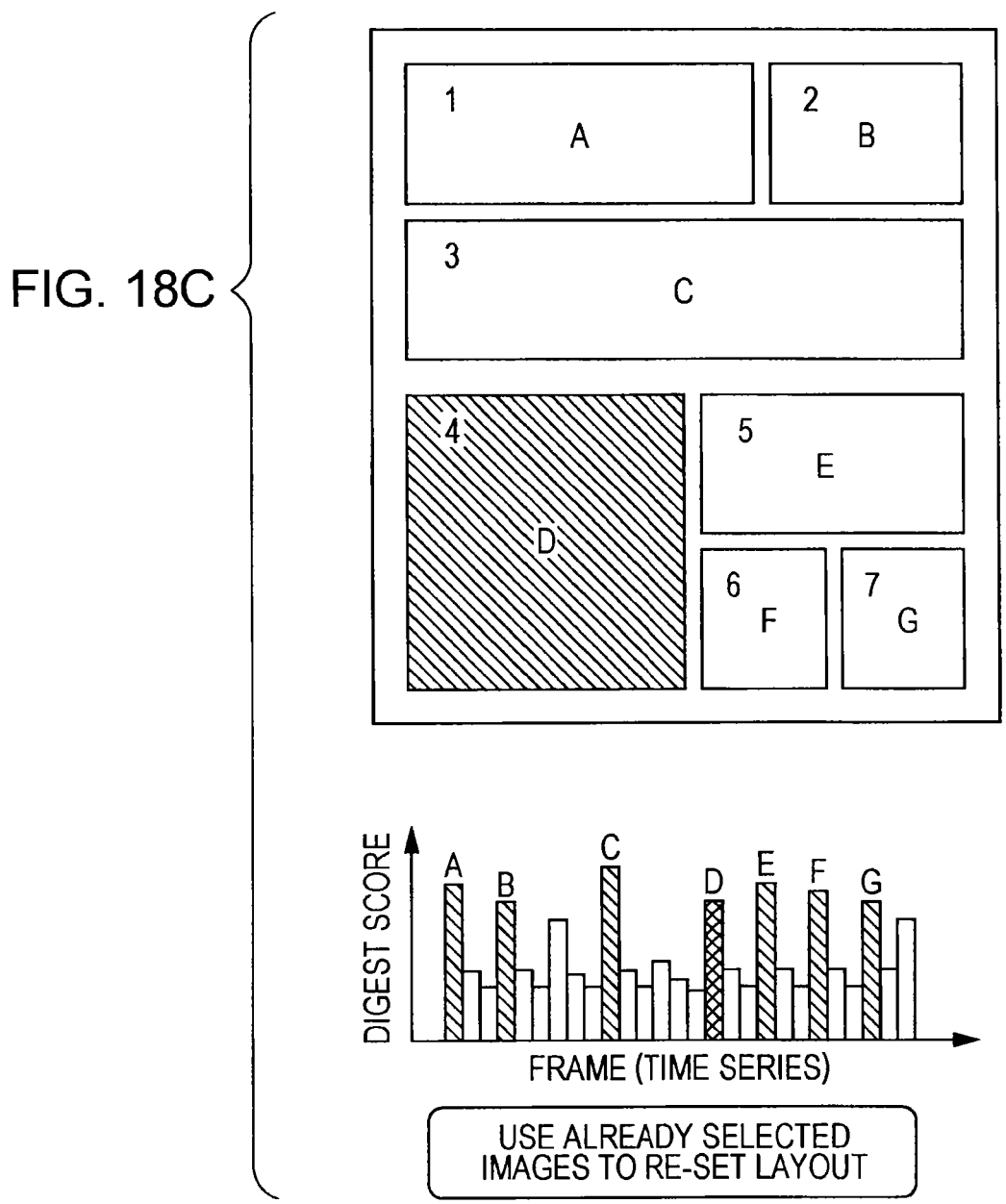
FIG. 18C illustrates layout-edit processing for the comic representation data in the embodiment.

For executing processing for changing the shape of the panel in a state as described above, the comic-representation-data editing section 105 may employ any of two types of method illustrated in FIGS. 18B and 18C.

In panel-shape change processing illustrated in FIG. 18B, the comic-representation-data editing section 105 designates, as a first edit-unit tier, the area up to a position immediately before the frame image associated with the panel whose shape was changed by the user operation, designates, as a second edit-unit tier, the area after the frame image for the panel whose shape was changed, and performs re-setting of the layout of the panels and re-setting of the frame images associated with the panels in one of the first edit-unit tier and the second edit-unit tier.

In the example illustrated in FIG. 18B, the comic-representation-data editing section 105 designates the frame image A to a position immediately before the panel image D in the amount-of-features display region as a first edit-unit tier, designates the frame images present immediately after the frame image D in the amount-of-features display region as a second edit-unit tier, and performs re-setting of the layout of the panels and re-setting of the frame images associated with the panels in one of the edit-unit tiers.

It is now assumed that re-setting of the layout of the panels and re-setting of the frame images associated with the panels have been executed in the second edit-unit tier. In this case, since the size of the panel D specified by the user is a size reflecting the user's intension, the comic-representation-data editing section 105 uses the region located to the right of the panel D in the layout illustrated in the upper part of FIG. 18B (i.e., the region surrounded by a dotted line in the upper part of FIG. 18B) to execute processing for arranging the images displayed in the amount-of-features display region and selected from the second edit-unit tier.

In this case, the comic-representation-data editing section 105 outputs, for example, the size of an available layout region and the digest scores of the frame images present in the second edit-unit tier, the digest scores being displayed in the amount-of-features display region, to the comic-representation-data generation processing section 103 and requests for re-layout processing. Thereafter, the comic-representation-data editing section 105 edits the current comic representation data in accordance with the result of the re-layout processing performed by the comic-representation-data generation processing section 103. As a result of such processing, for example, a new layout as illustrated in the upper part of FIG. 18B is generated.

In an example illustrated in FIG. 18C, the comic-representation-data editing section 105 uses only the already selected seven frame images (the images A to G) to re-set the layout while maintaining the time-series transition. In this case, since the size of the panel D specified by the user is also a size reflecting the user's intention, the comic-representation-data editing section 105 re-sets the layout by using the region, except for the panel D, in the layout illustrated in the upper part of FIG. 18C. In this case, it is assumed that one entire page illustrated in the upper part of FIG. 18C is set in one edit-unit tier.

In the example illustrated in FIG. 18C, the comic-representation-data editing section 105 selects seven frame images A, B, C, D, E, F, and G and the comic-representation-data generation processing section 103 re-sets the sizes of the panels in accordance with the values of the digest scores associated with the seven frame images and the size of the layout region excluding the panel D. As a result, a layout as illustrated in the upper part of FIG. 18C is generated.

Thus, when the panel-shape change is specified by a user operation, the comic-representation-data editing section 105 can execute the panel-shape change processing by using one of the above-described two types of method.

[Modification of Display Region (Cropped Region) of Panel Image]

Next, processing for modifying a region (a cropped region) included in the frame image associated with the panel and displayed within the panel will be specifically described with reference to FIG. 19.

In the comic representation data in the present embodiment, the frame image may be associated with the panel so that the entire image is displayed in the panel or the frame image may be associated with the panel so that only part of the frame image is displayed in the panel. The comic-representation-data editing section 105 may edit the display region (cropped region) of the image displayed in the panel in accordance with a user operation.

Figure 19:
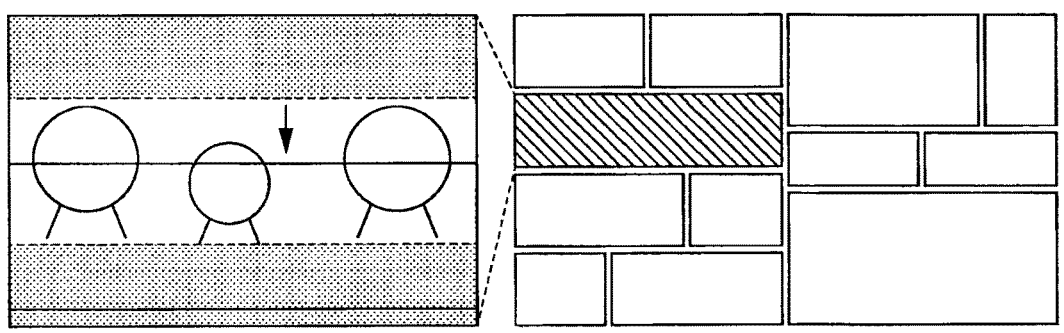
FIG. 19 illustrates layout-edit processing for the comic representation data in the embodiment.

When one panel listed in the preview display region is selected by a user operation, the thumbnail image for the panel selected by the user is displayed in the image display region, as illustrated in FIG. 19. In this case, when the entire area of the frame image is not displayed in the panel, part of the image displayed in the panel is shown in the preview display region in a highlighted manner with a surrounding frame, as illustrated in FIG. 19.

Accordingly, when the size or position of the surrounding frame indicating the cropped region is changed according to a user operation, the comic-representation-data editing section 105 adjusts the image region to be displayed in the panel, in accordance with the user operation. Thus, the comic-representation-data editing section 105 can edit the region of the image displayed in the panel in accordance with a user operation.

Although FIG. 19 illustrates a case in which the user edits the surrounding frame to specify a cropped region, the user may also specify the coordinates to specify a cropped region.

[Addition/Removal of Effect to/from Panel]

Figure 20:
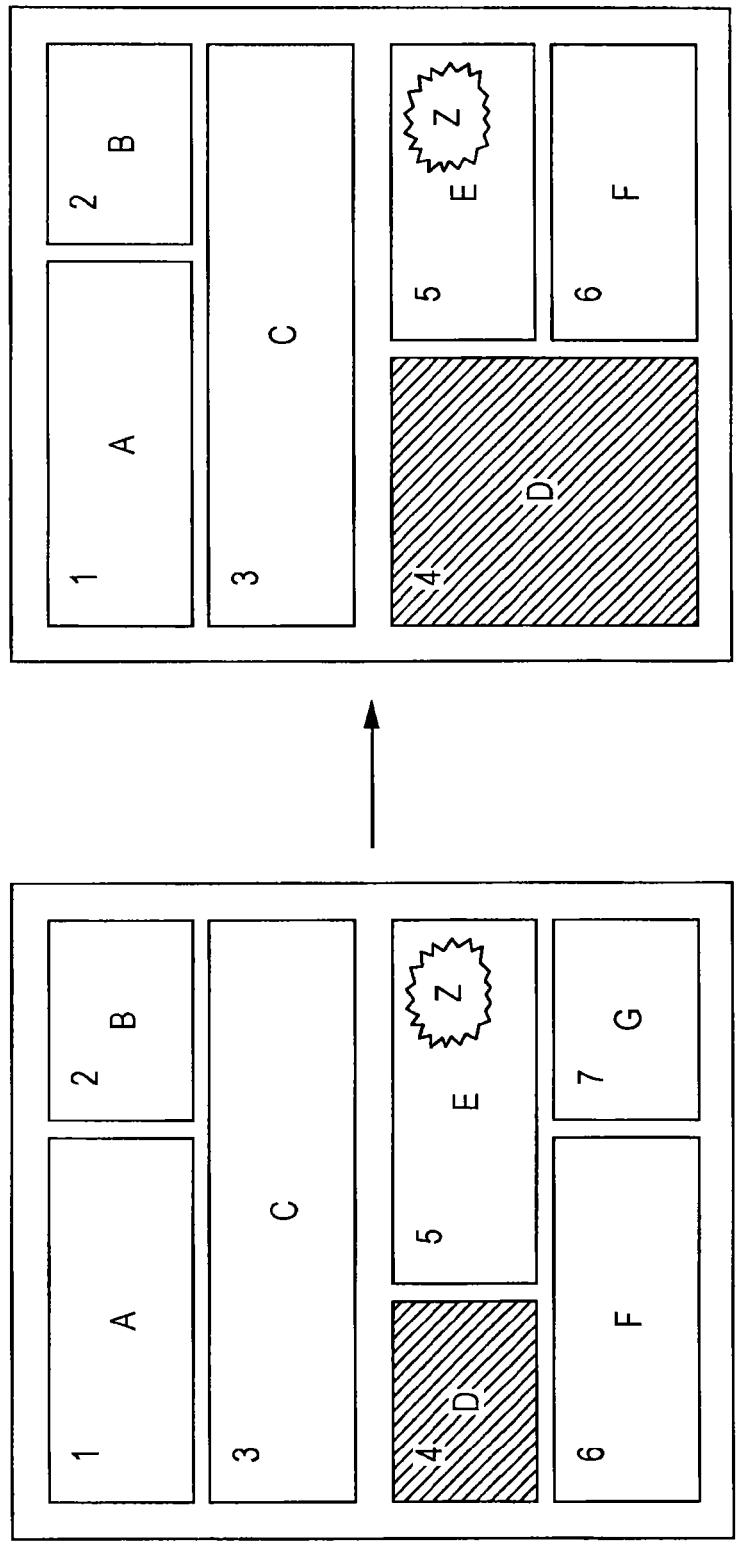
FIG. 20 illustrates layout-edit processing for the comic representation data in the embodiment.

Next, processing for adding an effect to a panel and processing for removing an effect from a panel will be specifically described with reference to FIG. 20.

The information processing apparatus 10 according to the present embodiment can add an effect object, including at least one of a speech balloon, a speech bubble, and a screen effect as illustrated in FIGS. 6 and 7, to an arbitrary spot in the page layout in the comic representation data. Similarly, the information processing apparatus 10 according to the present embodiment can remove an already arranged effect object from the page layout.

In this case, the information processing apparatus 10 according to the present embodiment manages the positions of the effect objects arranged in each page layout, on the basis of the coordinates. A coordinate system representing the positions of the arranged effect objects may be an absolute coordinate system with its origin located at the upper left vertex of each page layout or a coordinate system representing positions relative to the panels including the effect objects. Which of the absolute coordinate system and the relative coordinate system is to be used to manage the effect objects may be specified by the user, as appropriate.

A case in which the page layout has a layout as illustrated in the left part of FIG. 20 and an effect object Z is added to the panel 5 by a user operation will be discussed by way of example. In this case, the position of the effect object Z may be represented in an absolute coordinate system using the upper left vertex of the panel 1 as a reference point or may be represented as a position relative to the image associated with the panel 5.

A case in which, in a comic-style page layout as illustrated in the left part of FIG. 20, a user operation is performed to give an instruction for enlarging the panel D, as illustrated in the right part of FIG. 20, will now be discussed by way of example. In this case, when the position of the effect object Z is managed based on the absolute coordinate system, the comic-representation-data editing section 105 does not change the position of the effect object Z, regardless of the user operation performed by the user. When the position of the effect object Z is managed as a position relative to the panel, the effect object Z is re-set while the coordinate system of the panel with which the effect object Z is associated is maintained.

The comic-representation-data editing section 105 may delete the panel with which the effect object is associated from the page layout in accordance with a user operation. In such a case, when the position of the effect object is managed based on the absolute coordinate system, the effect object is not affected, but when the position of the effect object is managed as a position relative to the panel, the comic-representation-data editing section 105 deletes the effect object from the layout in conjunction with deletion of the panel.

While the panel-shape change processing has been described above in conjunction with a particular example, the comic-representation-data editing section 105 performs processing that is similar to the that in other edit processing, such as replacement of a panel image, addition or deletion of a panel, and change of a cropped region.

[Selection/Change of Theme for Entire Layout]

Next, theme selection/change processing for an entire layout will be briefly described with reference to FIG. 21.

Figure 21:
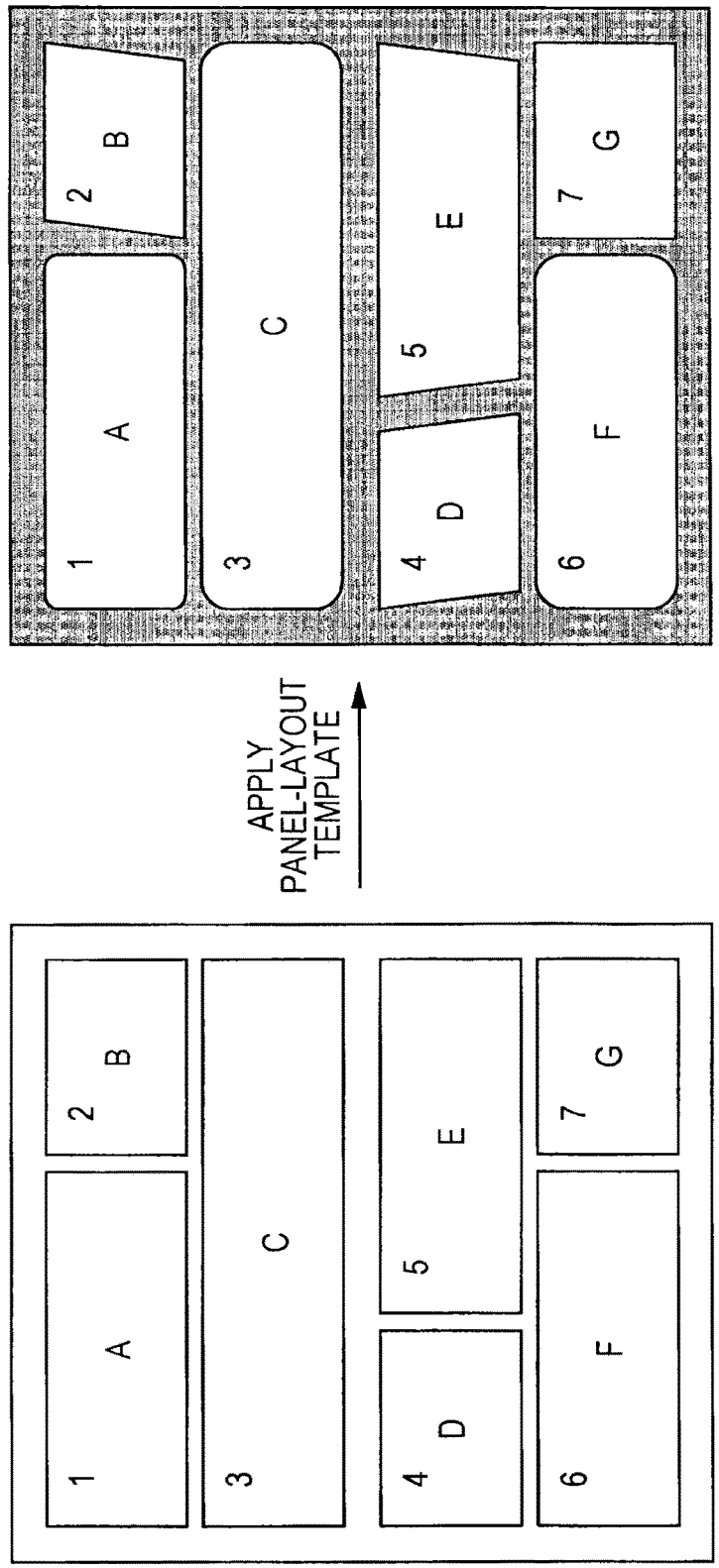
FIG. 21 illustrates layout-edit processing for the comic representation data in the embodiment.

As illustrated in FIG. 21, the comic-representation-data editing section 105 can change a page background and the shapes of the panels in already generated comic representation data, in accordance with various preset templates. As illustrated in FIG. 21, the shape of each panel is not limited to a rectangular shape and may be any shape.

When a panel-layout template containing a page background is selected by a user operation, the comic-representation-data editing section 105 performs masking processing on the panel shapes in the generated comic representation data in accordance with the panel shapes in the selected template. As a result, a page layout as illustrated in the left part of FIG. 21 is changed to a page layout as illustrated in the right part of FIG. 21.

The functions of the comic-representation-data editing section 105 according to the present embodiment have been specifically described above with reference to FIGS. 13A to 21.

The comic-representation executing section 107 will now be described with reference back to FIG. 11.

The comic-representation executing section 107 is realized by, for example, a CPU, a ROM, and a RAM. The comic-representation executing section 107 executes comic representation, for example, as illustrated in FIGS. 8 to 10, by executing an application for executing the comic representation data generated by the comic-representation-data generation processing section 103 or the comic representation data resulting from the edit processing performed by the comic-representation-data editing section 105. The application for executing the comic representation data may be a dedicated application for displaying comics as illustrated in FIGS. 2 to 10 or may be a general application, such as a web browser. The comic-representation executing section 107 executes the comic representation data to display a comic representation on a display section (not illustrated) via the display control section 109.

The display control section 109 is realized by, for example, a CPU, a ROM, a RAM, an output device, and a communication device. The display control section 109 obtains data that is stored in the storage section 111 or the like and that corresponds to what is to be displayed on the display screen and displays the obtained data on the display screen. When a signal indicating movement of the position-selecting object, such as a pointer, is transmitted from the input device, such as a mouse, a keyboard, a touch panel, a gesture input device, and an eye-gaze device, provided at the information processing apparatus 10, the comic-representation executing section 107 displays the movement of the movement-selecting object on the display screen in accordance with the transmitted signal. When a request for changing what is displayed on the display screen is issued from the comic-representation-data generation processing section 103, the comic-representation-data editing section 105, and the comic-representation executing section 107, the display control section 109 changes what is displayed on the display screen in accordance with the request issued from those processing sections.

The display control section 109 according to the present embodiment can perform various types of display control for not only the display device provided at the information processing apparatus 10, but also a display device directly connected to the information processing apparatus 10 or a display device connected through any network. Thus, the display control section 109 according to the present embodiment can realize display control for any display device provided outside the information processing apparatus 10.

The storage section 111 is implemented by, for example, a RAM or a storage device. The storage section 111 stores object data to be displayed on the display screen. The "object data" as used herein includes arbitrary parts, such as icons, buttons, and thumbnails, constituting a graphical user interface (GUI). The storage section 111 may also store various parameters, a transition in the middle of processing, and so on obtained when the information processing apparatus 10 according to the present embodiment executes various programs including the applications as illustrated in FIGS. 2 to 10 or some type of processing, as well as various databases, as appropriate. In addition, the storage section 111 may store various types of moving-picture data, including moving-picture data obtained with a video camera or mobile phone or moving-picture content such as TV (television) content, and still-picture data obtained with a digital still camera, a mobile phone, and so on.

The processing sections, such as the content-data obtaining section 101, the comic-representation-data generation processing section 103, the comic-representation-data editing section 105, the comic-representation executing section 107, and the display control section 109, can freely access the storage section 111 to write data thereto or read data therefrom.

One example of the functions of the information processing apparatus 10 according to the present embodiment has been described above. The elements described above may be implemented by general-purpose components and circuits or may be implemented by hardware dedicated to the functions of the elements. All of the functions of the elements may also be realized by a CPU and so on. The configuration employed can thus be modified as appropriate in accordance with the technical level in each case in which the present embodiment is implemented.

A computer program for realizing the functions of the information processing apparatus according to the embodiment described above may be created and incorporated into a personal computer or the like. A computer-readable recording medium on which such a computer program is stored may also be supplied. Examples of the recording medium include a magnetic disk, an optical disk, a magneto-optical disk, and a flash memory. The compute program may be distributed through a network or the like without use of the recording medium.

<First Modification>

The functions of the content-data obtaining section 101, the comic-representation-data generation processing section 103, the comic-representation-data editing section 105, the comic-representation executing section 107, the display control section 109, and the storage section 111 illustrated in FIG. 11 may be implemented in any pieces of hardware if the pieces of hardware can transmit/receive information to/from each other through a network. The processing performed by one processing section may be implemented by a single piece of hardware or may be realized by distributed processing using multiple pieces of hardware.

Figure 22:
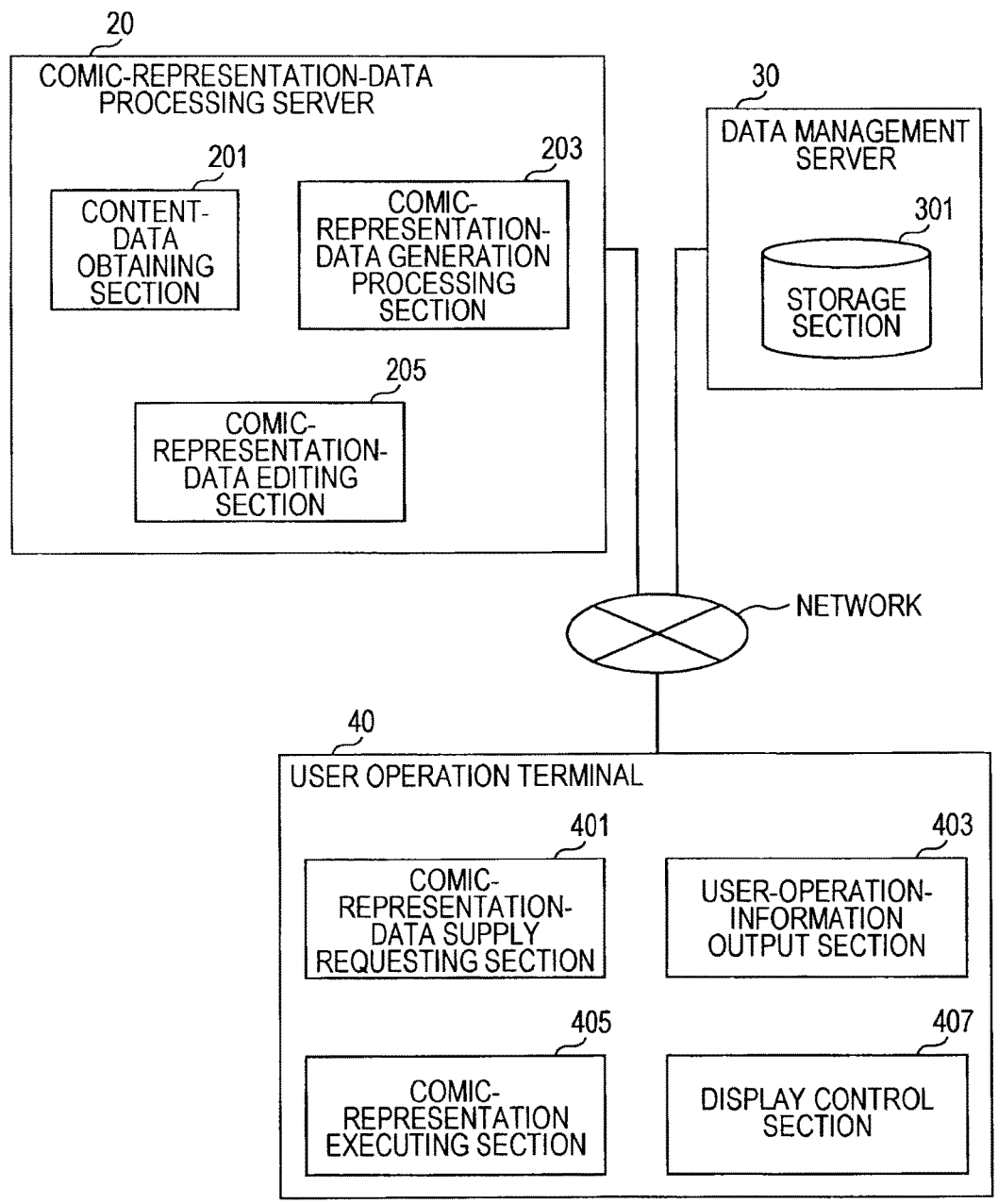
FIG. 22 is a block diagram illustrating a first modification of the information processing apparatus according to the embodiment.

FIG. 22 illustrates an example of an information processing system when the functions of the information processing apparatus 10 according to the present embodiment is realized in a distributed manner by a comic-representation-data processing server 20, a data management server 30, and a user operation terminal 40 which can communicate with each other through a network.

In accordance with a request from the user operation terminal 40, the comic-representation-data processing server 20 performs processing for generating comic representation data and supplies the generated comic representation data to the user operation terminal 40. The comic-representation-data processing server 20 also obtains already generated comic representation data from the data management server 30, and performs processing for editing the comic representation data on the basis of user operation information (information regarding a user operation) output from the user operation terminal 40.

The comic-representation-data processing server 20 generally includes a content-data obtaining section 201, a comic-representation-data generation processing section 203, and a comic-representation-data editing section 205.

The content-data obtaining section 201 and the comic-representation-data generation processing section 203 have configurations and advantages that are similar to those of the content-data obtaining section 101 and the comic-representation-data generation processing section 103 included in the information processing apparatus 10 according to the first embodiment. Thus, a detailed description is not given hereinafter.

The comic-representation-data editing section 205 according to this modification has a configuration and advantages that are similar to those of the comic-representation-data editing section 105 included in the information processing apparatus 10 according to the first embodiment. The comic-display-data editing section 205, however, is different from the comic-representation-data editor 105 in that, on the basis of the user operation information transmitted from the user operation terminal 40, the edit processing is performed on the comic representation data generated by the comic-display-data generation processing section 203, the comic representation data stored by the data management server 30, or the comic representation data held by the user operation terminal 40. Thus, a detailed description is not given hereinafter.

The data management server 30 generally includes a storage section 301 that stores comic representation data generated by the comic-representation-data processing server 20, as illustrated in FIG. 22. One or more comic-representation-data processing servers 20 and one more user operation terminals 40 may be connected to the data management server 30 through the network, such as the Internet. When a request for supplying comic representation data is received from any of the comic-representation-data processing server(s) 20 and the user operation terminal(s) 40, the data management server 30 outputs the requested comic representation data to the requesting apparatus.

As illustrated in FIG. 22, the user operation terminal 40 generally includes a comic-representation-data supply requesting section 401, a user-operation-information output section 403, a comic-representation executing section 405, and a display control section 407.

The comic-representation-data supply requesting section 401 requests the comic-representation-data processing server 20 or the data management server 30 to supply the comic representation data. The comic-representation-data supply requesting section 401 also requests the comic-representation-data processing server 20 to perform processing for editing already generated comic representation data.

Upon supply of the desired comic representation data from the comic-representation-data processing server 20 or the data management server 30, the comic-representation-data supply requesting section 401 outputs the comic representation data to the comic-representation executing section 405.

The user-operation-information output section 403 outputs, as the user operation information, information indicating an operation (a user operation) that the user performed on the input device (such as a mouse, a keyboard, a touch panel, a gesture input device, and an eye-gaze input device) provided at the user operation terminal 40. When the user-operation-information output section 403 outputs such user operation information to the comic-representation-data processing server 20, the comic-representation-data editing section 205 in the comic-representation-data processing server 20 can perform processing for editing the comic representation data desired by the user.

The comic-representation executing section 405 and the display control section 407 in the present modification have configurations and advantages that are similar to those of the comic-representation executing section 107 and the display control section 109 included in the information processing apparatus 10 according to the first embodiment. Thus, a detailed description is not given hereinafter.

The first modification of the information processing apparatus 10 according to the first embodiment has been briefly described above with reference to FIG. 22.

(Hardware Configuration of Information Processing Apparatus According to Embodiment of Present Disclosure)

Figure 23:
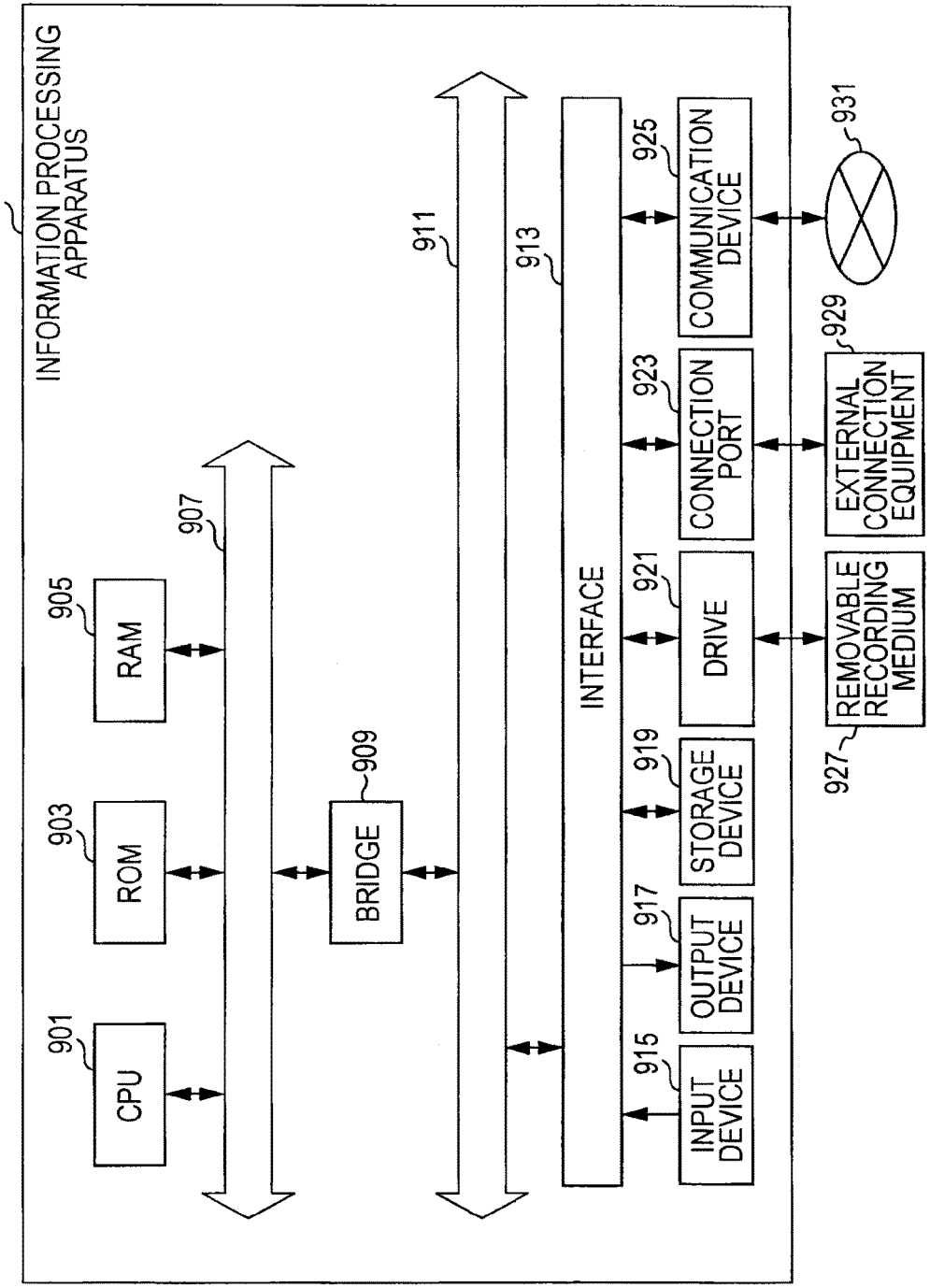
FIG. 23 is a block diagram illustrating the hardware configuration of the information processing apparatus according to the embodiment of the present disclosure.

Next, the hardware configuration of the information processing apparatus 10 according to the embodiment of the present disclosure will be described in detail with reference to FIG. 23. FIG. 23 is a block diagram illustrating the hardware configuration of the information processing apparatus 10 according to the embodiment of the present disclosure.

The information processing apparatus 10 generally includes a CPU 901, a ROM 903, and a RAM 905. The information processing apparatus 10 further includes a host bus 907, a bridge 909, an external bus 911, an interface 913, an input device 915, an output device 917, a storage device 919, a drive 921, a connection port 923, and a communication device 925.

The CPU 901 serves as a computation processing device and a control device and controls at least one of the operations of the information processing apparatus 10 in accordance with various programs recorded in the ROM 903, the RAM 905, the storage device 919, or a removable recording medium 927. The ROM 903 stores programs, computation parameters, and so on used by the CPU 901. The RAM 905 temporarily stores programs used by the CPU 901, parameters that vary as appropriate during execution of the programs, and so on. The CPU 901, the ROM 903, and the RAM 905 are interconnected through the host bus 907, which is implemented by an internal bus, such as a CPU bus.

The host bus 907 is connected to the external bus 911, such as a PCI (peripheral component interconnect/interface) bus, via the bridge 909.

The input device 915 serves as operating means operated by the user and includes, for example, a mouse, a keyboard, a touch panel, buttons, switches, levers, a gesture input device, and an eye-gaze input device. The input device 915 may include, for example, remote controlling means (e.g., a remote controller) utilizing infrared or another type of electromagnetic wave or external connection equipment 929, such as a mobile phone or a PDA (personal digital assistant), that is compatible with the operation of the recording apparatus 10. In addition, the input device 915 may include, for example, an input control circuit for generating an input signal on the basis of information input by the user with the aforementioned operating means and outputting the input signal to the CPU 901. By operating the input device 915, the user of the information processing apparatus 10 can input various types of data to the information processing apparatus 10 and can give an instruction for a processing operation thereto.

The output device 917 may include devices that are capable of visually or aurally notifying the user about the obtained information. Examples of such devices include display devices, such as a CRT (cathode ray tube) display device, a liquid-crystal-display device, a plasma display device, an EL (electroluminescent) display device, a projector, and a lamp; sound output devices, such as a speaker and a headphone; a printer apparatus; a mobile phone; and a facsimile apparatus. The output device 917 outputs, for example, results obtained by various types of processing executed by the information processing apparatus 10. More specifically, the display device display results, obtained by various types of processing executed by the information processing apparatus 10, in the form of text or images. The sound output device converts audio signals including reproduced voice data and sound data into analog signals and outputs the analog signals.

The storage device 919 is a data-storing device implemented as one example of the storage section of the information processing apparatus 10. The storage device 919 may include, for example, a magnetic storage device such as a HDD (hard disk drive), a semiconductor storage device, an optical storage device, and a magneto-optical storage device. The storage device 919 stores programs and various types of data executed by the CPU 901, various types of data externally obtained, and so on.

The drive 921 is a reader/writer for the recording medium and is built into or externally attached to the information processing apparatus 10. The drive 921 reads information recorded in a loaded removable recording medium 927 and outputs the information to the RAM 905. Examples of the removable recording medium 927 include a magnetic disk, an optical disk, a magneto-optical disk, and a semiconductor memory. The drive 921 can also perform writing/recording to the removable recording medium 927. The removable recording medium 927 may be, for example, a DVD medium, an HD-DVD medium, or a Blu-ray medium. The removable recording medium 927 may also be a CF (CompactFlash: registered trademark) medium, a flash memory, or an SD (Secure Digital) memory card. In addition, the removable recording medium 927 may be, for example, electronic equipment or an IC (integrated circuit) card having a contactless IC chip.

The connection port 923 serves as a port for directly connecting equipment to the information processing apparatus 10. Examples of the connection port 923 include a USB (universal serial bus) port, an IEEE (Institute of Electrical and Electronics Engineers) 1394 port, and a SCSI (small computer system interface) port. Other examples of the connection port 923 include an RS-232C port, an optical audio terminal, and an HDMI (high-definition multimedia interface) port. Through connection of the connection port 923 to the external connection equipment 929, the information processing apparatus 10 directly obtains various types of data from the external connection equipment 929 or directly supplies various types of data to the external connection equipment 929.

The communication device 925 is, for example, a communication interface, implemented by a communication device or the like, for connection with a communications network 931. The communication device 925 is, for example, a communication card for a wired or wireless LAN (local area network), a Bluetooth (registered trademark) communication, or a WUSB (Wireless USB). The communication device 925 may also be a router for optical communication, a router for an ADSL (asymmetric digital subscriber line), or a modem for various types of communication. The communication device 925 can transmit/receive signals to/from the Internet or other communication equipment in accordance with a predetermined protocol, such as a TCP/IP. The communications network 931 connected to the communication device 925 may include a network connected in a wired or wireless manner. The communications network 931 may be realized by the Internet, a home LAN, infrared communication, radio-wave communication, satellite communication, or the like.

The description above has been given of one example of the hardware configuration that can realize the functions of the information processing apparatus 10 according to the embodiment of the present disclosure. The elements described above may be implemented by general-purpose components or may be implemented by hardware dedicated to the functions of the elements. The hardware configuration employed can thus be modified as appropriate in accordance with the technical level in each case in which the present embodiment is implemented.

(Summary)

As described above, in the information processing apparatus and the information processing method according to the embodiment of the present disclosure, the panel layout, effects, and so on with respect to digest content generated from a moving picture and/or a still picture and obtained by assigning images in a comic-style panel layout can be edited through simple interactions.

The information processing apparatus according to the embodiment of the present disclosure can provide a user interface that allows a user to easily perform digest-content edit tasks, such as panel addition and deletion, edit of regions, and edit of effects, on the basis of the generated digest content.

Although the preferred embodiment of the present disclosure has been described above in detail with reference to the accompanying drawings, the technical scope of the present disclosure is not limited to the particular example. It is apparent to those skilled in the art that various changes and modifications can be made within the technical scope recited in the appended claims and it is to be understood that such changes and modifications are also encompassed by the technical scope of the present disclosure.

Configurations as described below are also encompassed by the technical scope of the present disclosure.

(1) An apparatus including:
an edit command receiving unit configured to receive a command with respect to a first image to edit a comic style page layout including a plurality of images; and
an editing unit configured to edit the comic style page layout in accordance with the command and with respect to at least one of the plurality of images.
(2) The apparatus according to (1), wherein the comic style page layout includes at least one icon superimposed over at least one of the plurality of images.
(3) The apparatus according to (2), further comprising:
an icon selection unit configured to receive a selection of the icon to be superimposed over the at least one of the plurality of images.
(4) The apparatus according to (3), wherein the icon includes at least one of a speech bubble icon and a sound effect icon.
(5) The apparatus according to (3), wherein the editing unit moves the icon when the at least one of the plurality of images the icon is superimposed over is modified.
(6) The apparatus according to (1) to (5), further comprising:
a display control unit configured to control a display to display the comic style page layout including the plurality of images and a digest score for each of the plurality of images.
(7) The apparatus according to (6), wherein the display control unit controls the display to display a digest score for the first image along with digest scores for the plurality of images.
(8) The apparatus according to (6), wherein the display control unit controls the display to display digest scores for the plurality of images and the first image in an order based on a time each corresponding image was taken.
(9) The apparatus according to (8), wherein the display control unit controls the display to change the order of the digest scores based on a command received by the edit command receiving unit.
(10) The apparatus according to (6), wherein if the edit command receiving unit receives a command to add one image, the editing unit adds to the comic style page layout an image not included in the plurality of images having a highest digest score.
(11) The apparatus according to (6), wherein if the edit command receiving unit receives a command to increase a digest score for the first image to be greater than all images not in the plurality of images, and a command to delete one of the plurality of images, the editing unit adds the first image to the comic style page layout.
(12) The apparatus according to (6), wherein if the edit command receiving unit receives a command to replace an earlier image of the plurality of images with a later image, the display control unit controls the display to replace a digest score of the earlier image with a digest score of the later image.
(13) The apparatus according to (12), wherein if the edit command receiving unit receives the command to replace the earlier image of the plurality of images with the later image, the display control unit controls the display to replace the digest score of the later image with the digest score of the earlier image.
(14) The apparatus according to (1) to (13), wherein the editing unit adds the first image to the comic style page layout in accordance with the command and moves, resizes, or removes at least one of the plurality of images to provide space for the first image.
(15) The apparatus according to (1) to (14), wherein the editing unit removes an image from the comic style page layout in accordance with the command and moves or resizes at least one of the plurality of images to occupy space previously occupied by the image.
(16) The apparatus according to (1) to (15), wherein the editing unit changes a shape of at least one of the plurality of images in accordance with the command.
(17) The apparatus according to (1) to (16), wherein the editing unit changes a content of at least one of the plurality of images in accordance with the command by cropping the content with respect to an original image.
(18) The apparatus according to (1) to (17), wherein the editing unit changes a theme of the comic style page layout in accordance with the command.
(19) A method includes:
receiving a command with respect to a first image to edit a comic style page layout including a plurality of images; and
editing the comic style page layout in accordance with the command and with respect to at least one of the plurality of images.
(20) A non-transitory computer readable medium encoded with a program that, when loaded on a processor, causes the processor to perform a method including:
receiving a command with respect to a first image to edit a comic style page layout including a plurality of images; and
editing the comic style page layout in accordance with the command and with respect to at least one of the plurality of images.

It should be understood by those skilled in the art that various modifications, combinations, sub-combinations and alterations may occur depending on design requirements and other factors insofar as they are within the scope of the appended claims or the equivalents thereof.

What is claimed is:
1. An apparatus comprising:
circuitry configured to
generate a comic style page layout that includes a plurality of images;
generate a display window that includes a preview display region, an image display region and a feature display region, wherein the preview display region includes the comic style page layout including each image of the plurality of images, the image display region includes a first image of the plurality of images, and the feature display region includes a graphical representation of feature amounts of the plurality of images in the comic style page layout;

receive a command to change the feature amounts the command being generated in response to a user operation to the feature display region; and adjust the comic style page layout in accordance with the command to change the feature amounts;

display a digest score for each image of the plurality of images in the feature display region;

receive a first command to increase a digest score for a second image that is not in the plurality of images to be greater than a group of images that is not in the plurality of images, and a second command to delete one of the plurality of images, wherein the circuitry increases the digest score of the second image, deletes one of the plurality of images and adds the second image to the comic style page layout.

2. The apparatus according to claim 1, wherein the comic style page layout includes an icon that is superimposed over at least one image of the plurality of images, the feature display region includes a first object that corresponds to the icon, and the graphical representation in the feature display region illustrates a relationship between the first object and the at least one image of the plurality of images.

3. The apparatus according to claim 2, wherein the circuitry is configured to receive a selection of the icon to be superimposed over the at least one of the plurality of images.

4. The apparatus according to claim 3, wherein the icon includes at least one of a speech bubble icon and a sound effect icon.

5. The apparatus according to claim 3, wherein the circuitry is configured to move the icon when the at least one image of the plurality of images, in which the icon is superimposed over, is modified.

6. The apparatus according to claim 1, wherein the circuitry is configured to control display of the digest scores for the plurality of images in an order based on a time at which each corresponding image was taken.

7. The apparatus according to claim 6, wherein the circuitry is configured to change the order of the digest scores based on an input command received from a user.

8. The apparatus according to claim 1, wherein when the circuitry receives a command to add one image to the comic style page layout, the circuitry adds an image to the comic style page layout that has a highest digest score.

9. The apparatus according to claim 1, wherein when the circuitry receives a command to replace an earlier image of the plurality of images with a later image of the plurality of images, the circuitry replaces a digest score of the earlier image with a digest score of the later image.

10. The apparatus according to claim 9, wherein when the circuitry receives the command to replace the earlier image with the later image, the circuitry replaces the digest score of the later image with the digest score of the earlier image.

11. The apparatus according to claim 1, wherein circuitry is configured to add the first image to the comic style page layout in accordance with the command and move, resize or remove at least one image of the plurality of images to provide space for the first image.

12. The apparatus according to claim 1, wherein the circuitry is configured to remove an image from the comic style page layout in accordance with the command and move or resize at least one image of the plurality of images to occupy space previously occupied by the image.

13. The apparatus according to claim 1, wherein the circuitry is configured to change a shape of at least one of the plurality of images in accordance with the command.

14. The apparatus according to claim 1, wherein the circuitry is configured to change a content of at least one of the plurality of images in accordance with the command by cropping the content with respect to an original image.

15. The apparatus according to claim 1, wherein the circuitry is configured to change a theme of the comic style page layout in accordance with the command.

16. The apparatus according to claim 1, wherein the graphical representation of the feature amounts is a bargraph illustrating the feature amounts of the plurality of images in the comic style page layout.

17. A method comprising:

generating a comic style page layout that includes a plurality of images;

generate a display window that includes a preview display region, an image display region and a feature display region, wherein the preview display region includes the comic style page layout including each image of the plurality of images, the image display region includes a first image of the plurality of images, and the feature display region includes a graphical representation of feature amounts of the plurality of images in the comic style page layout;

receive a command to change the feature amounts the command being generated in response to a user operation to the feature display region; and adjust the comic style page layout in accordance with the command to change the feature amounts;

display a digest score for each image of the plurality of images in the feature display region;

receive a first command to increase a digest score for a second image that is not in the plurality of images to be greater than a group of images that is not in the plurality of images, and a second command to delete one of the plurality of images, wherein the circuitry increases the digest score of the second image, deletes one of the plurality of images and adds the second image to the comic style page layout.

18. A non-transitory computer readable medium encoded with a program that, when loaded on a processor, causes the processor to:

generating a comic style page layout that includes a plurality of images;

generate a display window that includes a preview display region, an image display region and a feature display region, wherein the preview display region includes the comic style page layout including each image of the plurality of images, the image display region includes a first image of the plurality of images, and the feature display region includes a graphical representation of feature amounts of the plurality of images in the comic style page layout;

receive a command to change the feature amounts the command being generated in response to a user operation to the feature display region; and adjust the comic style page layout in accordance with the command to change the feature amounts;

display a digest score for each image of the plurality of images in the feature display region;

receive a first command to increase a digest score for a second image that is not in the plurality of images to be greater than a group of images that is not in the plurality of images, and a second command to delete one of the plurality of images, wherein the circuitry increases the digest score of the second image, deletes one of the plurality of images and adds the second image to the comic style page layout.

* * * * *